(12) United States Patent
West

(10) Patent No.: US 12,624,976 B1
(45) Date of Patent: May 12, 2026

(54) CLAMP-ON THERMAL METER FOR NON-INTRUSIVE FLOW MEASUREMENT IN A CONDUIT

(71) Applicant: Advantek Consulting Engineering Inc., Melbourne, FL (US)

(72) Inventor: Michael Kenneth West, Melbourne, FL (US)

(73) Assignee: Advantek Consulting Engineering Inc., Melbourne, FL (US)

( * ) Notice: Subject to any disclaimer, the term of this patent is extended or adjusted under 35 U.S.C. 154(b) by 0 days.

(21) Appl. No.: 19/233,702

(22) Filed: Jun. 10, 2025

Related U.S. Application Data

(63) Continuation-in-part of application No. 17/869,288, filed on Jul. 20, 2022, now abandoned, which is a
(Continued)

(51) Int. Cl.
*G01F 1/68* (2006.01)
*G01F 1/684* (2006.01)
(52) U.S. Cl.
CPC ................................. *G01F 1/6847* (2013.01)
(58) Field of Classification Search
CPC .......... G01F 1/68; G01F 1/684; G01F 1/6847; G01F 1/688
See application file for complete search history.

(56) References Cited

U.S. PATENT DOCUMENTS 4,817,427 A * 4/1989 Kitano .................. G01F 1/6847
47/1.01 R
5,367,905 A 11/1994 Senock
(Continued)

FOREIGN PATENT DOCUMENTS

GB 601298 A 5/1948
WO 2004100788 A1 11/2004

*Primary Examiner* — Nguyen Q. Ha
(74) *Attorney, Agent, or Firm* — Brian S. Steinberger; Hilary F. Steinberger; Steinberger IP Law

(57) ABSTRACT

Compact, non-intrusive thermal flow measurement devices, systems and methods configured to clamp externally onto a pipe, tube, or conduit and quantitatively determine fluid flow without penetrating the conduit or disturbing the internal fluid. Flow rate of fluid includes gas and liquid flows of fluid. The devices, systems and methods include a compact flexible clamp structure housing at least one low-power heater and a plurality of temperature sensors positioned upstream, downstream, and at the heater location along the conduit wall. The conformal clamp enables rapid, one-handed installation on conduits of varying diameters. During operation, the heater raises the pipe wall temperature at the point of measurement, and the flow of fluid induces a directional thermal gradient detected by the sensors. An electronic processor calculates fluid flow rate based on steady-state temperature differences using phase-specific empirical calibrations. The devices, systems and methods accommodate both gas and liquid flows using the same sensor configuration. Additional features include an integrated digital display, wireless communication, and support for portable, battery-powered use. The devices, systems and methods enable precise flow measurement across a range of applications, without pressure drop or fluid access, and supports field deployment, diagnostics, and integration into external monitoring platforms.

19 Claims, 18 Drawing Sheets

Related U.S. Application Data continuation-in-part of application No. 17/079,009, filed on Oct. 23, 2020, now abandoned.

(56)

References Cited

U.S. PATENT DOCUMENTS

| | | | |
|---|---|---|---|
| 5,645,348 | A | 7/1997 | Stulen et al. |
| 5,678,418 | A | 10/1997 | Ueno |
| 5,741,968 | A | 4/1998 | Arai |
| 5,936,156 | A * | 8/1999 | Roberts .................. G01F 1/684 |
| | | | 73/204.17 |
| 6,962,077 | B2 * | 11/2005 | Gerhardt ............... G01F 1/6847 |
| | | | 73/204.13 |
| 7,249,503 | B2 | 7/2007 | Gehman et al. |
| 7,354,193 | B2 | 4/2008 | Hsu |
| 7,373,839 | B2 | 5/2008 | Wiest |
| 7,743,604 | B1 | 6/2010 | Albanesi |
| 7,895,888 | B2 | 3/2011 | Hasebe |
| 8,714,030 | B1 | 5/2014 | Liu |
| 9,003,877 | B2 | 4/2015 | Qasimi et al. |
| 9,146,172 | B2 | 9/2015 | Trescott |
| 9,581,480 | B2 * | 2/2017 | Tanaka ..................... G01F 15/00 |
| 9,964,423 | B2 * | 5/2018 | Grohmann .............. G01F 1/684 |
| 10,113,916 | B2 | 10/2018 | Hong et al. |
| 10,139,256 | B2 | 11/2018 | Zhao et al. |
| 10,352,745 | B2 | 7/2019 | Easey et al. |
| 10,364,555 | B2 | 7/2019 | Trescott |
| 10,365,165 | B2 | 7/2019 | Harju |
| 2007/0241090 | A1 | 10/2007 | Bourget et al. |
| 2009/0084177 | A1 | 4/2009 | Ao et al. |
| 2017/0268934 | A1 | 9/2017 | Harju et al. |
| 2019/0041248 | A1 | 2/2019 | Yamazaki et al. |
| 2019/0204131 | A1 | 7/2019 | Jablokov |
| 2021/0310840 | A1 | 10/2021 | Feagler |
| 2022/0184301 | A1 | 6/2022 | Lee |

* cited by examiner

FIGURE 4

Center Cross Section View

171  Upper Half Heater Temperature Sensor

180  Upper Half Heater Element

100

70

280  Lower Half Heater Element

271  Lower Half Heater Temperature Sensor

1/2" Pipe

75

480  Flexible Pad Pliable Support

141  Upper Half Heater Pad

241  Lower Half Heater Pad

480  Flexible Pad Pliable Support

200

Center Cross Section View

171 Upper Half Heater Temperature Sensor

180 Upper Half Heater Element

70

280 Lower Half Heater Element

271 Lower Half Heater Temperature Sensor

100

200

1/4" Pipe

480 Flexible Pad Pliable Support

141 Upper Half Heater Pad

75

241 Lower Half Heater Pad

480 Flexible Pad Pliable Support

330

340

ThemaFlow TF-100

CLAMP-ON THERMAL METER FOR NON-INTRUSIVE FLOW MEASUREMENT IN A CONDUIT

CROSS REFERENCE TO RELATED APPLICATIONS

This application is a Continuation-In-Part of U.S. patent application Ser. No. 17/869,288 filed Jul. 20, 2022, which is a Continuation-In-Part of U.S. application Ser. No. 17/079, 009 filed Oct. 23, 2020, now abandoned. The entire disclosure of each of the applications listed in this paragraph are incorporated herein by specific reference thereto.

FIELD OF INVENTION

This invention relates generally to flow meters for measuring fluid flow, that includes liquid and gas flow, and in particular to systems, devices and methods for sensing the flow rate of fluid in a pipe, tube or conduit, without physically penetrating the pipe or conduit wall to directly contact the fluid within the pipe or conduit, by clamping about the pipe, tube or conduit by measuring data from heater elements and temperature sensing elements that are in half sensor shells that clamp about the exterior of pipes, tubes and conduits of any cross section shape.

BACKGROUND AND PRIOR ART

Fluid flow through pipes, tubes, and conduits encompasses both liquid and gas phases. Accurate measurement of such flow is critical in many applications, including refrigeration, semiconductor and pharmaceutical manufacturing, automotive fuel systems, and aerospace hydraulic systems. In these and other fields, accurate real-time flow data is essential for testing, process control, diagnostics, or product measurement and verification. Portability, compactness, and non-intrusiveness are highly desirable due to cost, space, and practicality-particularly in systems where fluid access is limited, such as inside equipment enclosures, or where fluid flow cannot be interrupted. The present invention addresses these critical needs.

Most conventional flow sensors require insertion into the conduit, permanent in-line installation, or rerouting of fluid through the measurement device. These configurations are often intrusive and require system shutdown, depressurization, or fluid evacuation to install, particularly in closed systems like refrigeration circuits. Three known non-intrusive alternatives; transit-time ultrasonic, Doppler, and Coriolis flow meters avoid pipe penetration, but they are often bulky, exceedingly expensive, complex to set up, calibrate and use, or ineffective for some fluids and tubing sizes. Other known flow sensors are not compact, portable, self-contained or robust; and as a consequence of these shortcomings, known flow sensors cannot meet many critical needs.

The fundamental thermal flow sensing method is a well-established concept. A heater is positioned between two temperature sensors, upstream and downstream. The flow of a fluid past the temperature sensors and the heater element will tend to heat the downstream flowing fluid. The heater raises the fluid temperature differential, which is influenced by the flow velocity. The relationship between temperature difference and flow rate can be mathematically modeled. Some devices alternatively monitor the energy input required to maintain a constant heater temperature, which also relates to flow rate.

However, nearly all thermal flow sensors known in the art require fluid to flow directly through the sensor body, making them intrusive by design. This prevents use in systems where breaking the line for installation of the sensor is impractical, unsafe, or costly. Insertion creates limitations when applied to sealed, pressurized systems like chillers or refrigeration equipment, where refrigerant must be evacuated to allow sensor installation, and corrosive fluids, such as acetone or hypochlorous acid, can damage thermal flow sensor components, rendering insertion impractical.

In operation, known thermal sensors often require high energy to create large temperature gradients. This creates problems when measuring high-density or high-specific-heat fluids such as water, glycol, and liquid refrigerants, or volatile or flammable liquids such as solvents and hydrocarbon fuels. High thermal input risks vaporizing the fluid, creating measurement error and safety concerns. These constraints strictly limit the practical use of prior art thermal flow sensors.

Simpler thermal devices used in leak detection, such as residential water or gas pipe alarms, also employ temperature sensors and/or heaters clamped externally onto pipes. These systems are designed to detect only a binary state: flow or no flow. They lack the resolution and methodology to calculate quantitative mass flow, and they are not portable or readily reusable across multiple systems.

Clearly unaddressed by prior art is a compact, clamp-on, self-contained thermal flow measurement device capable of accurately quantifying both gas and liquid flow without penetration of the conduit. Further, while the same sensor configuration may be used to measure either gas or liquid flow, the empirical flow equations and calibration constants differ for each phase. Known references do not teach or suggest the use of externally applied thermal input and three spatially distinct pipe-wall temperature measurements-upstream, at the heater, and downstream—for steady-state, phase-specific flow rate calculation.

Recent improvements to the present invention further expand its capability and address further limitations of the prior art. A new conformal clamp-on design allows a single pair of clamp half-shells to wrap snugly around a wide range of standard pipe diameters (e.g., ¼", 5⁄16", 3⁄8", ½", and 5⁄8") without the need to swap components. This circumferential contact between the clamp and pipe is critical for ensuring stable thermal coupling and accurate flow measurement. This novel improvement enables one-handed installation into tight enclosures and truly portable operation across multiple systems and tube sizes.

In addition, a digital LED display has been integrated into the clamp handle, enabling direct viewing of measured temperatures and calculated flow rate at the point of use. Flow rate calculations, previously performed externally, can now be executed within the clamp itself using its internal processing. Finally, Bluetooth wireless communication has been added alongside the existing wired interface, allowing the device to transmit temperature and flow data directly to external systems such as smartphones, tablets, or wireless meters. These enhancements improve the device's utility in field service, diagnostics, and integration with modern data platforms-features not disclosed in prior art non-intrusive thermal flow sensors.

Various patents and combinations of patents have been proposed over the years in related areas, but fail to overcome all the problems with the prior art to satisfactorily address critical needs.

None of the prior art discloses or suggests using a common set of externally measured pipe-wall temperatures-upstream, heater, and downstream—as the basis for calculating quantitative flow for both gas and liquid. While gas and liquid flows are not measured simultaneously, the present invention employs the same non-intrusive sensor configuration to collect thermal data, with flow determined using phase-specific empirical equations and calibration constants. This flexible but unified sensing method is neither taught nor motivated by the prior art, and enables a single clamp-on device to be applied across both liquid and gas applications.

Certain new components of the present invention, e.g. Bluetooth communication or digital temperature/flow display, may be known in the broader field of instrumentation. The new flexible conformal clamp structure, in particular, is functionally necessary to achieve full circumferential pipe wall contact across variable pipe diameters, which is critical for thermal accuracy and practicality; not a just matter of design expediency. Integration of these new features into a compact, clamp-on, non-intrusive, self-contained thermal flow meter designed for accurate, empirical measurement of both gas and liquid flow is neither taught, motivated nor suggested by prior art references or any logical combination thereof. The level of innovation required to design and economically incorporate these features must not be underestimated. None of the thermal flow measurement prior art mentions these features, nor do they address the distinct challenges that such integration solves; particularly the need for one-handed portability, compactness, phase-specific accuracy, and on-board real-time measurement without need of an external meter. An amalgamation of similar components drawn from dissimilar prior art to arrive at the present invention would invariably constitute hindsight reconstruction, not a predictable evolution of the prior art.

Unlike prior devices measuring 18 inches or more, the compact form factor of the present invention (i.e., under approximately 8 inches (193 mm)) is not a matter of design preference but purposefully enables practical in-field use within tight equipment enclosures and typical cooling unit cabinets, which allows true one-handed operation, making it functionally and operationally distinct from larger, cumbersome, multi-step prior art devices.

Even considering prior art collectively, combinations of previous inventions fail to teach or motivate the novel compact arrangement and method disclosed herein. The present invention is composed of several elements, yet is not proved obvious if the elements were separately known in the prior art; the present innovative combination yields more than predictable results: a non-intrusive structure, empirical steady-state flow calculations, dual-phase applicability, and real-world deployment practicality emerge from an inventive configuration not derivable from the prior art separately or as a whole.

Related prior art does not disclose or suggest the use of three independently measured temperature points on the pipe wall-upstream, heater, and downstream—in a clamp-on configuration, nor do they enable quantitative flow rate calculation for both gases and liquids using phase-specific empirical calibration. Prior art devices are either intrusive, cumbersome, limited to a single-phase regime, or rely on fundamentally different sensing principles. The present invention combines structural, methodological, and functional elements in a manner not taught, motivated or plainly suggested by the prior art separately or in combination.

Review of Related Prior Art

U.S. Pat. No. 5,645,348 to Stulen et al., which is incorporated by reference, uses one high-power heater pad and measurement of numerous pipe wall temperatures in a two-dimensional pattern, in a very large, cumbersome and makeshift fashion. Stulen uses a powerful heater pad of 250 Watts, which is over 10 times more heat than the present invention and an impractically large amount of power for a portable device. The time required to obtain a steady-state reading is too long at 60 to 90 minutes, which allows very high pipe temperatures to develop that can be hot enough to vaporize liquids inside the pipe, making it impractical for accurately measuring flow of volatile liquids such as refrigerants and fuels, as well as being cumbersome and labor intensive to use. Stulen's device is far too large and cumbersome to physically fit into a refrigerating unit or cooler equipment cabinet.

Great Britain Patent GB 601,298 to Smith describes a c. 1948 flow detecting apparatus that senses only two/binary conditions: to determine either there is flow or there is not flow. Smith does not precisely measure the quantity of flow, only the presence and direction of flow. Smith uses a split shell with a heating element, which requires the device to be substantially large overall, between 18 to 24 inches, and cumbersome compared to the present novel compact clamp system which can be less than four inches. As such, the Smith device is too large and unwieldy for many applications. The heater element power is also impractically large at 35 Watts, which can cause many fluids to vaporize inside the pipe; and, thermo-junctions are much less accurate than the thermistors used in the present invention.

Neither Stulen nor Smith, individually nor combined, suggest the specific combination of features of the present invention: a compact, portable clamp-on system with a low-power heater for direct, accurate, orientation-independent quantitative flow measurements applicable to volatile liquids and gases.

Stulen explicitly states its method is ineffective for liquid flow measurement or pressure determination, further demonstrating that the quantitative liquid flow measurement capabilities of the present invention are novel and not obvious.

Smith does not provide adequate teaching or enablement regarding accurate flow rate measurement, providing at best speculative mention without support or practical detail. Thus, the combination of Stulen and Smith fails to disclose or suggest the present novel and non-obvious improvements; particularly the quantitative flow measurement, compact size, low power consumption, portability, orientation independence, and applicability to both volatile liquids and gases.

U.S. Pat. No. 10,352,745 to Easey, which is incorporated by reference, describes a method of analyzing and processing temperature data to determine if there is leakage from a pipe. Easey does not expressly employ a heater element, and requires an impractically long time to arrive at an accurate determination because of the relatively small temperature difference between the pipe and ambient, as compared with the much higher temperature difference created with a heater element. It is best suited for a permanent leak detector application.

Although, Easey superficially covers the concept of utilizing temperature differences for flow determination, it neither explicitly teaches nor practically enables active thermal input combined with precise, quantitative flow measurement. The present invention's active heating approach, rapid and precise measurement methodology, clear quantitative measurement capability, and enhanced portability represent a substantial non-obvious improvement beyond the speculative and passive methods described by Easey, which fails to anticipate or render obvious the present invention's specific combination of features and methods.

U.S. Pat. No. 7,895,888 to Hasebe, which is incorporated by reference, is fundamentally tailored to measuring extremely small fluid flow rates (nanoliters to milliliters per minute), using a permanently bonded and intrusive system based on identifying the apex of temperature distributions along a tube.

In contrast, the present invention explicitly addresses larger, industrially relevant flow ranges (1 to 10 liters per minute) using a direct, simpler, non-intrusive clamp-on method based on empirically measured pipe-wall temperature differences at clearly defined upstream and downstream locations relative to a heater. The inventive step embodied by this portable, externally attachable, and economically manufacturable configuration is neither anticipated nor suggested by Hasebe's specialized and complex methodology. Thus, the present invention represents a distinct and non-obvious advancement beyond the teachings of Hasebe, which is fundamentally unsuitable and not practically scalable to the present invention's significantly larger fluid flow applications.

A combination of Smith and Hasebe is technically incompatible and fundamentally impractical. Smith offers only qualitative binary detection without any quantitative measurement capability or method. Hasebe describes a highly specialized, micro-scale, intrusive, and permanently installed measurement system that is fundamentally incompatible with Smith's structure and purpose.

Neither Smith nor Hasebe individually, nor in combination teach, motivate or suggest the critical features of the present invention, including its non-intrusive, clamp-on portability, direct and accurate quantitative measurement method, and suitability for industrial-scale fluid flow applications. Thus, the present invention represents a clear and non-obvious advancement.

US Published Patent Application 2021/0310840 to Feagler, which is incorporated by reference, discloses an intrusive flow sensor for medical IV applications, limited to flow rates under 180 mL/min, over 20 times less flow than the present invention's typical range. Feagler's device requires fluid to flow through a conduit in the sensor housing and heats an internal thermal conductor, not the tube wall. Flow is calculated by adjusting heater power to maintain a target temperature difference; there is no heater temperature sensor, and the temperature sensors are not exposed to the conduit.

In contrast, the present invention is a non-intrusive clamp-on device that heats the pipe wall and calculates flow from directly measured upstream, downstream, and heater temperatures, enabling accurate, empirical flow measurement at industrial flow rates. The range of the present invention is substantially higher such as 3785 mL/min, or 1 gallon per minute, and thus solves fundamentally different thermo-physical measurement challenges than Feagler's significantly smaller-scale device.

US Published Patent Application 2022/0184301 to Lee, which is incorporated by reference, focuses exclusively on external ultrasonic and temperature sensors to qualitatively analyze fluid properties such as viscosity, density, and contamination. Lee does not disclose explicitly measuring fluid flow quantitatively.

In contrast, the present invention specifically provides quantitative fluid flow measurement through empirically validated, digitally processed, controlled thermal gradients, and distinct sensor placements. This combination of elements and methodologies is neither disclosed, suggested nor taught by Lee.

U.S. Pat. No. 5,678,418 to Ueno et al., which is incorporated by reference, discloses an air-conditioning system for vehicles, focusing on the control of refrigerant flow and oil return within the system. Ueno does not involve clamp-on sensors, external temperature measurement, or flow rate determination using thermal gradients. Ueno's system is fully integrated and intrusive, operating within the closed-loop of the air-conditioning circuit, and is unrelated to non-intrusive, external flow measurement techniques.

Patent WO 2004/100788 A1 to Wikefeldt discloses an intrusive flow sensor integrated into catheter tubing for measuring urine flow at rates up to 2 liters per hour, which is more than 100 times lower than the flow range of the present invention. Wikefeldt heats the fluid directly inside a dedicated flow channel, and uses upstream and downstream temperature sensors in contact with the fluid to determine flow by analyzing the decay of a pulsed thermal input.

In contrast, the subject invention is a non-intrusive, clamp-on device that heats the tube wall, not the fluid, and uses continuously applied thermal input along with three discrete temperature sensors-upstream, downstream, and at the heater location—to calculate flow from empirical, steady-state temperature differences. Wikefeldt does not disclose or suggest this measurement configuration or methodology and does not include a heater temperature sensor.

Wikefeldt in combination with Ueno, Smith, Hasebe, Feagler, and Lee, collectively describe various thermal sensing devices with differing purposes, configurations, and limitations, but do not disclose or suggest the present invention.

Ueno and Smith address qualitative or binary detection of fluid presence or type without enabling quantitative flow measurement.

Hasebe and Feagler disclose intrusive micro-scale sensors designed for very low flow rates, while Lee focuses on ultrasonic analysis of fluid properties rather than flow quantification.

Wikefeldt describes a transient thermal pulse sensor embedded in catheter tubing, lacking both a heater temperature sensor and a non-intrusive clamp-on configuration.

These references span incompatible flow regimes, sensor geometries, and operational principles, and there is no teaching, motivation, hint or suggestion within the prior art to combine them to produce a non-intrusive, portable device that quantitatively measures both gas and liquid flow using a steady-state method based on empirically calibrated temperature differences measured independently at upstream, downstream, and heater locations. The combination of these disparate systems would not lead predictably to the configuration and performance characteristics of the present invention.

U.S. Pat. No. 5,741,968 to Arai, which is incorporated by reference, describes a basic, box-shaped flow detecting assembly consisting of two rectangular half-shells secured together with screws. The assembly geometry and method of attachment are rudimentary, cumbersome, and do not provide portability or ease of quick installation or removal.

U.S. Published Patent Application 2019/0041248 (JP6867909B2) to Yamazaki et al., which is incorporated by reference, describes a thermal flowmeter, which references an adjustable power heater and an external sensing unit to measure a thermal diffusion state of the fluid heated by the heater.

Yamazaki references the "pipe 122 is formed of, for example, glass . . . ", paragraph 27 and does not reference metal conduits, and the like, and does not describe any type of portability or clamping system. Rather than calculating flow directly from a temperature difference, Yamazaki dynamically drives heater power to achieve and maintain a preset temperature difference, and subsequently correlates adjusted heater power to flow rate using a series of relatively complex calculations involving a calibration curve function, which is more difficult to calibrate and use, and is less accurate than the subject invention.

US Published Patent Application 2019/0204131 to Jablokoy, which is incorporated by reference, discloses a device for detecting pipeline leaks or blockages by monitoring temperature profiles along a pipe using externally placed temperature sensors and optional heating elements.

Jablokov explicitly focuses on qualitative anomaly detection rather than precise quantitative measurement of fluid flow rate.

In contrast, the subject invention explicitly employs empirically calibrated measurements of specific upstream and downstream temperature differences combined with a heating element to accurately calculate fluid flow rates quantitatively.

U.S. Pat. No. 10,365,165 to Harju, which is incorporated by reference, describes a basic pipe temperature sensing device utilizing a common two-jaw clamp to attach a thermocouple directly onto a pipe surface. Harju's device measures temperature at only a single location, does not measure fluid flow, and includes neither heating nor cooling elements.

U.S. Pat. No. 7,354,193 to Hsu, which is incorporated by reference, discloses a specialized, handheld clamp used solely for measuring the heated or cooled temperature of a heat pipe, which is a niche application for heat pipe batch testing after manufacture. Hsu's device comprises a basic clamp equipped with a thermocouple and either a heating or cooling pad.

Hsu does not detect, measure, or suggest measuring fluid flow; its sole function is static temperature measurement of heat pipes, with no fluid movement inside.

U.S. Pat. No. 10,139,256 to Zhao et al., which is incorporated by reference, shows and describes a MEMS Flow Sensor and is an intrusive system where flow must be diverted through a microchip to make the measurement.

Installation requires a break in the tubing, and so is not suitable for non-intrusive or portable applications.

Zhao neither suggests, motivates nor implies transitioning from a highly specialized intrusive MEMS flow sensor integrated into a wafer microchip to a non-intrusive, externally mounted clamp-on sensor system. The conceptual leap from micro-scale, intrusive MEMS fluid channels to macro-scale, external non-intrusive measurement involves non-obvious technical innovations and novel methodological approaches that are not apparent in the prior art.

Many inventions use heating elements and temperature sensors for various other purposes, for example, U.S. Pat. No. 7,743,604 to Albanesi, which is incorporated by reference, describes an apparatus for providing heat to the dump body of a dump truck, having nothing to do with using temperature sensors to calculate flow rates of fluid passing through a pipe. Rather than for flow measurement, heat is used to reduce adherence of material to the dump body, which is wholly unrelated to the subject invention.

U.S. Published Patent Application 2007/0241090 to Bourget et al., which is incorporated by reference, shows a hot-melt hose assembly, with heaters and temperature sensors, for dispensing hot-melted adhesive, and having nothing to do with measuring or calculating flow rates through a fluid in a hose or pipe.

Thus, the need exists for solutions to the above problems with the prior art.

SUMMARY OF THE INVENTION

A primary objective of the present invention is to provide a compact, non-intrusive thermal flow sensor that clamps externally onto a pipe, tube, or conduit and measures fluid flow-gas or liquid-without disturbing or penetrating the flow. The invention enables accurate, quantitative flow measurement using externally applied thermal input and multiple independently measured temperatures along the outer pipe wall, and is well suited for portable, field-deployable, battery-powered, or space-constrained applications.

A secondary objective of the present invention is to provide systems, devices and methods for sensing the flow rate of fluid in a pipe, tube or conduit, without physically penetrating the pipe or conduit wall to directly contact the fluid within the pipe or conduit, by clamping about the pipe, tube or conduit.

Another objective of the present invention is to provide systems, devices and methods for sensing the flow rate of fluid in a pipe, tube or conduit, simple, easily manufactured, low cost, portable, and easy to operate as compared with prior art.

Unlike prior art devices, which require heating the bulk fluid, the present invention relies on detecting the cooling effect of the flowing fluid on the heated pipe wall, using steady-state temperature gradients to infer flow rate. The system uses a small heater to locally raise the pipe wall temperature and at least three spatially distinct temperature sensors-positioned upstream, downstream, and on the heater—to measure the thermal profile induced by convective heat transfer. The flow of fluid moves heat along the pipe wall in the direction of flow, creating a quantifiable gradient. Because the device heats only a small section of the pipe wall, not the bulk fluid volume, it requires significantly lower thermal input, reducing power consumption and measurement latency, as well as risk of vaporization. This innovation is particularly advantageous when measuring flows of high heat capacity or volatile liquids.

The thermal sensing assembly is fully external to the fluid flow, imposes no pressure drop, and is effective across a wide range of fluid types and pipe diameters. The system's empirical calculation method uses phase-specific calibration—accommodating both gas and liquid flows with the same sensor configuration—and can be adapted to a range of flow regimes by varying the calibration constants or the number and positioning of temperature sensors. This flexible, multi-phase capability is not disclosed nor suggested by the prior art, which generally restricts devices to either gas or liquid, or qualitative or binary detection only.

A key structural innovation introduced in this continuation-in-part is a flexible, conformal clamp that self-adapts to multiple pipe diameters while maintaining continuous snug circumferential contact-critical for thermal coupling precision. Unlike prior art devices with rigid geometries, this clamp enables rapid one-handed installation, precise sensor contacts, and reuse across multiple systems with no field reconfiguration.

The updated system also integrates a digital display directly into the clamp handle, enabling local readout of temperatures and flow rate without an external meter, along with a wired connection to an external meter if desired.

Additionally, Bluetooth connectivity enables wireless data transmission to external systems such as smartphones, tablets, or cloud platforms. These features support both stand-alone operation as well as wireless or wired integration into diagnostic or monitoring environments. While such digital display and wireless features may exist in unrelated instrumentation, their integration into a compact, self-contained, clamp-on, thermally-based flow sensor—with phase-specific measurement capability and empirical calibration—is not taught or suggested in the known art.

Taken together, the features of the present invention offer a portable, low-power, non-intrusive thermal flow sensor that provides precise quantitative measurement of both gas and liquid flows using steady-state surface temperature profiles, a reusable adaptive clamp, and modern onboard and wireless data outputs. No known combination of prior art devices discloses, suggests or motivates this arrangement of structural, functional, and empirical features, nor achieves the same level of measurement capability, field utility, and cross-phase compatibility in a single compact instrument.

Embodiments of this invention provide portability and non-intrusiveness; with no penetration of the conduit, no need for permanent installation, and no re-routing of flow through the measurement device required. The disclosed clamp-on thermal sensor embodiments are less complex, and easier to manufacture, set up, operate and calibrate than known non-intrusive flow measurement devices. They are more compact, portable and robust than currently available non-intrusive flow sensors.

The subject invention features a thermal flow measurement device including at least one sensing element responsive to temperature, and at least one inductive or resistive heater element. The temperature sensing element(s) and heater element(s) can be arranged in a two-piece cylindrical-shaped shell. Each half-shell is the shape of the pipe or conduit, such as but is not limited to a half-cylinder for a circular cross section pipe, tube or conduit, which snuggly fits around and contacts the exterior of the pipe, tube or conduit carrying the flow to be measured to provide maximum contact surface area. The temperature responsive sensors are located a relatively small distance apart, approximately 11/2 inches (38 mm), to provide a compact device.

In the preferred embodiment, the two-piece shell is formed as the jaws of a portable and hand-held pivoting clamp, which are opened and quickly attached to and can later be quickly removed from a pipe, which is a one-handed clamp system.

In another embodiment, the two-piece shell is formed into two housings, which are clamped about and contact the exterior of the pipe, tube or conduit carrying the flow to be measured, in a fixed mechanical clamp system using machine screws, bolts, or other fastening hardware such as a locking snap, or ratcheting tie.

Both embodiments are attached about a pipe without penetrating, cutting, opening or in any way disturbing the pipe or the flow within, and are easily removed as desired after the flow measurement is completed, to later be used again on the same or another pipe, tube or conduit; or if needed the sensor can remain installed indefinitely.

The invention features a small, low power (approximately 10 to approximately 20 Watts), low voltage (approximately 24 volts) inductive or resistive heater element, arranged to primarily heat the pipe, tube or conduit wall rather than the bulk fluid flow as do known sensors, which results in a more compact and portable device. The benefit is a lower cost, more practical flow measurement sensor. The disclosed basis of measurement is variation of tube wall temperature, allowing flow measurement to be made without significant increase in bulk fluid temperature, which would necessitate more heat energy input, a much larger device, and potentially disturb the fluid or process, for example, vaporization of volatile refrigerant or hydrocarbon fuel. In this way, the disclosed invention utilizes the existing pipe, tube or conduit wall as a working component of the flow sensor. The pipe, tube, or conduit wall temperature is balanced between heating by the heater element tending to raise the temperature of the pipe wall, with convective cooling by the fluid flow tending to decrease the temperature of the tube wall.

The heater element in the most basic embodiment adds a small amount of heat to the tube wall at a constant heat flux rate, for example, approximately 10 to approximately 20 Watts per square inch (approximately 1.6 to approximately 3.2 Watts per square centimeter) of tube outer surface area.

An embodiment of the non-intrusive thermal flow measurement device for quantitatively determining fluid flow in a conduit, includes: a flexible clamp structure configured to externally conform to and maintain continuous circumferential thermal contact with conduits of varying diameters without requiring interchangeable inserts; at least one heater configured to provide a heat flux of approximately 10 to approximately 20 Watts per square inch, the heater configured to externally heat only a portion of a conduit wall at a measurement location, without directly heating bulk fluid inside the conduit wall, thereby avoiding vaporization and enabling portable, battery-powered operation; a plurality of temperature sensors positioned externally along the conduit wall, configured to measure temperature differential between multiple distinct points; and an electronic processor configured to calculate flow rate based on steady-state temperature differences measured by said sensors, wherein sensing temperature differences of the conduit wall to determine the flow rate passing through the conduit are completed within a time frame to steady-state within approximately 3 to approximately 15 minutes.

The flexible clamp structure can include two half-shells configured to flexibly adapt and snugly conform to conduit diameters between a range between approximately ¼ inch to approximately ⅝ inch.

The plurality of temperature sensors can include at least one sensor upstream of the heater, at least one sensor positioned directly on the heater, and at least one sensor downstream of the heater.

The device can further include a communication medium configured to transmit measured temperature and flow rate data through a wired connection.

The device can further include a communication medium configured to transmit measured temperature and flow rate data through at least one wireless connection selected, from the group consisting of Bluetooth, Wi-Fi Direct, NFC, Zigbee, and Z-Wave.

The device can further include a digital display integrated directly into the clamp structure, configured to locally display measured temperatures and calculated fluid flow rates without requiring an external meter.

The device can further include computation of fluid flow rate empirically from said steady-state temperature differentials is performed using calibration constants specific to fluid phases, enabling quantitative flow determination of gases and liquids using same sensor configuration.

The device can include for an approximately ¼" pipe, the time frame to steady-state is within approximately 3 minutes.

The device can include for an approximately ⅜" pipe, the time frame to steady state is within approximately 6 minutes.

The device can include for using same an approximately ⅝" pipe, the time frame to steady state is within approximately 15 minutes.

The device can include an overall weight up to approximately 1 pound or approximately 454 grams, overall length of the device is up to approximately 7.6" or approximately 193 millimeters, and overall width of the device is up to approximately 1.7" or approximately 43 millimeters.

The device can include spacing between each sensor is up to approximately 1.5 inches or 38 millimeters.

The device can include an upper half-shell of the two half-shells, includes: an upper flexible pad pliable support between the upper half-shell and an upper half heater temperature sensor, and an upper half heater pad between the upper half heater temperature sensor and an upper half heater element, and wherein a lower half-shell of the two half shells includes a lower flexible pad pliable support between the lower half-shell and lower half-heater temperature sensor, and a lower half heater pad between the lower half heater temperature sensor and a lower half heater element.

The device can include the flexible clamp structure having an upper arm having a grip end and a distal end with a concave lower surface, a lower arm having a grip end and a distal end with a concave upper surface, and a spring-loaded member for allowing the upper arm to pivot relative to the lower arm, wherein the concave lower surface on the distal end of the upper arm, and the concave upper surface on the distal end of the lower arm grips about a conduit wall.

The device can include the flexible clamp structure includes a fixed mechanical clamp assembly that includes an upper shell having a lower facing concave surface. And a lower shell having an upper facing concave surface, wherein the upper shell and the lower shell wrap about a section of the conduit wall.

The device can include for the fixed clamp assembly having fasteners selected from at least one of screws and bolts for locking the upper shell to the lower shell.

The device can include for the fixed clamp assembly having securing members selected from at least one of: magnets, latches, ties, spring clips, and latch clamps for securing the upper shell to the lower shell.

Another embodiment of the non-intrusive thermal flow measurement device for quantitatively determining fluid flow in a conduit, includes a flexible clamp structure configured to externally conform to and maintain continuous circumferential thermal contact with conduits of varying diameters without requiring interchangeable inserts, the flexible clamp structure comprises two half-shells configured to flexibly adapt and snugly conform to conduit diameters between a range between approximately ¼ inch to approximately ⅝ inch, wherein the flexible clamp structure includes an upper arm having a grip end and a distal end with a concave lower surface, and a lower arm having a grip end and a distal end with a concave upper surface, and a spring loaded member for allowing the upper arm to pivot relative to the lower arm, wherein the concave lower surface on the distal end of the upper arm, and the concave upper surface on the distal end of the lower arm grips about conduit wall; at least one heater configured to provide a heat flux of approximately 10 to approximately 20 Watts per square inch, the heater configured to externally heat only a portion of the conduit wall at a measurement location, without directly heating the bulk fluid inside the conduit wall, thereby avoiding vaporization and enabling portable, battery-powered operation; a plurality of temperature sensors positioned externally along the conduit wall, configured to measure temperature differential at distinct points, the plurality of temperature sensors includes at least one sensor upstream of the heater, at least one sensor positioned directly on the heater, and at least one sensor downstream of the heater, wherein spacing between each sensor is approximately 1.5 inches or 38 millimeters; wherein an upper half-shell of the two half-shells, includes: an upper flexible pad pliable support between the upper half-shell and an upper half heater temperature sensor, and an upper half heater pad between the upper half heater temperature sensor and an upper half heater element, and wherein a lower half-shell of the two half shells includes a lower flexible pad pliable support between the lower half-shell and lower half-heater temperature sensor, and a lower half heater pad between the lower half heater temperature sensor and a lower half heater pad between the lower half heater temperature sensor and a lower half heater element; and an electronic processor configured to calculate fluid flow rate based on steady-state temperature differences measured by said sensors, wherein sensing temperature differences of the pipe wall to determine the flow rate of the fluid passing through the conduit wall are completed within a time frame to steady state of approximately 3 to approximately 15 minutes, wherein overall weight of the device is up to approximately 1 pound or approximately 454 grams, overall width of the device is approximately 1.7 inches or approximately 43 millimeters, and overall length of the device is approximately 7.6 inches or approximately 193 millimeters.

Another embodiment of the non-intrusive thermal flow measurement device for quantitatively determining fluid flow in a conduit, includes a flexible clamp structure configured to externally conform to and maintain continuous circumferential thermal contact with conduits of varying diameters without requiring interchangeable inserts, the flexible clamp structure comprises two half-shells configured to flexibly adapt and snugly conform to conduit diameters between a range between approximately ¼ inch to approximately ⅝ inch, wherein the flexible clamp structure includes a fixed mechanical clamp assembly with an upper shell having a lower facing concave surface, and a lower shell having an upper facing concave surface, wherein the upper shell and the lower shell wrap about a section of the conduit wall, the fixed clamp assembly is assembled by either fasteners selected from at least one of screws and bolts for locking the upper shell to the lower shell, or is assembled by securing members selected from at least one of: magnets, latches, ties, spring clips, and latch clamps for securing the upper shell to the lower shell; at least one heater configured to provide a heat flux of approximately 10 to approximately 20 Watts per square inch, the at least one heater configured to externally heat only a portion of a conduit wall at a measurement location, without directly heating the bulk fluid inside the conduit, thereby avoiding vaporization and enabling portable, battery-powered operation; a plurality of temperature sensors positioned externally along the conduit wall, configured to measure temperature differential between distinct points, the plurality of temperature sensors includes at least one sensor upstream of the heater, at least one sensor positioned directly on the heater, and at least one sensor downstream of the heater, wherein spacing between each sensor is approximately 1.5 inches or approximately 38 millimeters; wherein an upper half-shell of the two half-shells, includes: an upper flexible pad pliable support between the upper half-shell and an upper half heater temperature sensor, and an upper half heater pad between the upper half heater temperature sensor and an upper half heater element; wherein a lower half-shell of the two half shells includes a lower flexible pad pliable support between the lower half-shell and lower half-heater temperature sensor, and a lower half heater pad between the lower half heater temperature sensor and a lower half heater element; and an electronic processor configured to calculate flow rate based on steady-state temperature differences measured by said sensors, wherein sensing temperature differences of the pipe wall to determine flow rate of the fluid passing through the conduit are completed within a time frame to steady state of approximately 3 to approximately 15 minutes, wherein overall weight of the device is up to approximately 1 pound or approximately 454 grams, overall width of the device is approximately 1.7 inches or approximately 43 millimeters, and overall length of the device is approximately 7.6 inches or approximately 193 millimeters.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 4 is a perspective (isometric) view of an upper and lower half of a sensor shell assembly, each having a convex outer surface and a concave interior surface with contour that conforms to match any pipe curvature. Each half-shell includes a centrally located heater element and at least three temperature sensors distributed along the flow axis; one upstream, one downstream, and one co-located with the heater, configured to detect steady-state thermal gradients.

DESCRIPTION OF THE PREFERRED EMBODIMENTS

Figure 1:
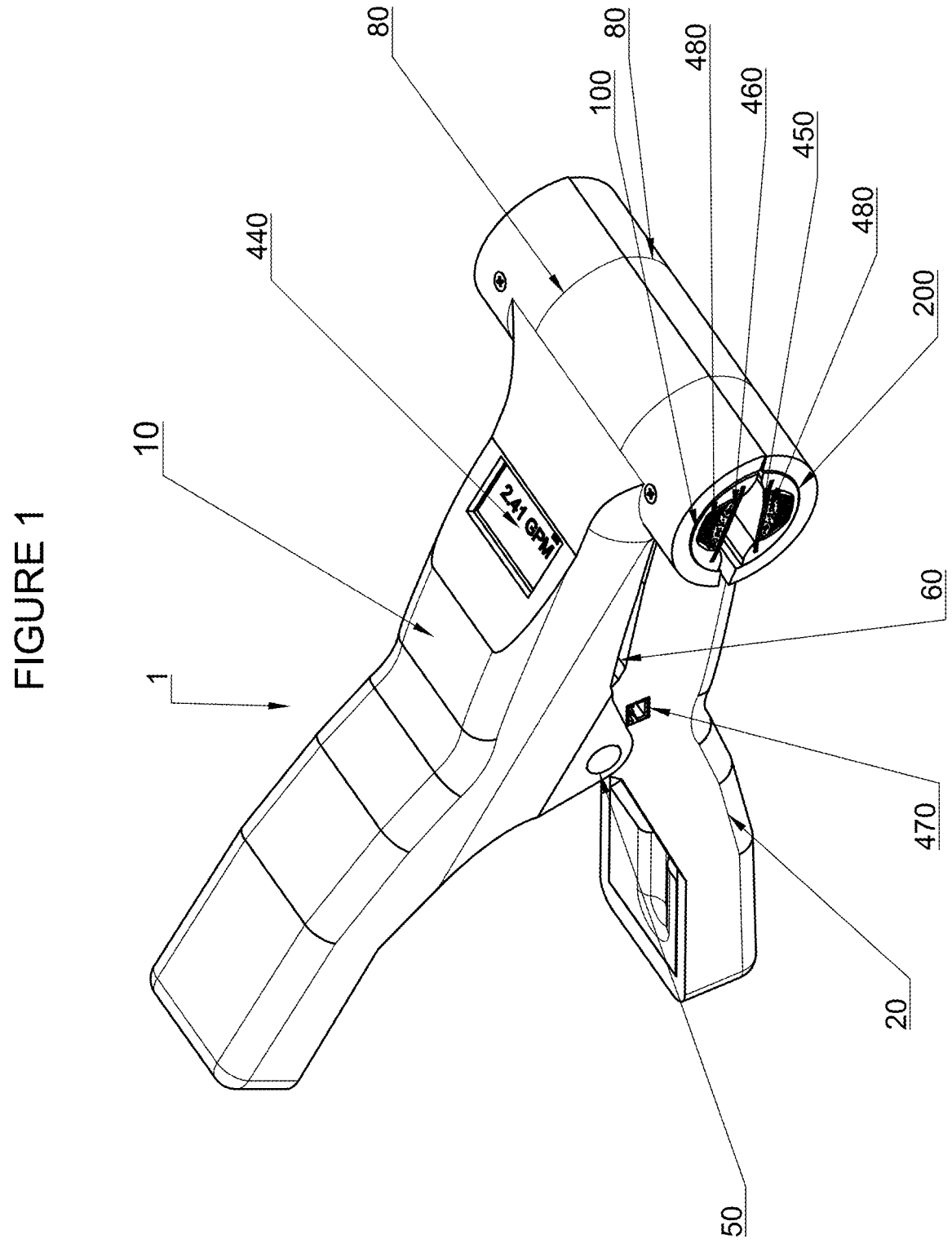
FIG. 1 is a perspective (isometric) view of a handheld pivoting clamp assembly in the closed position, with the jaws aligned but not engaged with any pipe. The assembly includes upper and lower arms joined by a pivot pin and spring. The interior of the jaws holds a two-piece sensor shell, configured to maintain conformal contact with the pipe wall. The clamp structure enables one-handed operation and adapts to multiple pipe diameters. A display may be integrated into the clamp handle to provide real-time temperature and flow data directly at the point of measurement.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout., and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Referring now to the figures, wherein like reference numerals identify corresponding or similar elements throughout the several views, the present invention relates to a non-intrusive thermal flow sensor system that clamps externally onto a pipe, tube, or conduit and measures the flow rate of fluid (liquid or gas) using steady-state temperature gradients and externally applied heat. The following description refers to illustrative embodiments of the invention, with reference to the accompanying drawings. These embodiments are provided to ensure a thorough understanding of the invention and are not intended to limit its scope, which extends to other variations and equivalents that will be apparent to those skilled in the art. The invention may be implemented using a variety of techniques, whether currently known or later developed, and is not limited to the specific arrangements or methods shown.

Features described in connection with one embodiment can be combined with features of other embodiments where applicable. Like reference numbers refer to like elements throughout. The terminology used herein is for descriptive purposes only and should not be construed as limiting. Additional advantages and modifications will become apparent from the following description and the accompanying figures.

A list of components shown in the Figures will now be described.

1 Handheld Pivoting Clamp Assembly
10 Upper Clamp Arm
20 Lower Clamp Arm
50 Pivot Point (Pivot Member)
60 Spring Joint Mechanism
70 Pipe/Tube/Conduit

16

75 Fluid Inside Pipe, Tube or Conduit
80 Thermal Insulation about Sensor Shell
100 Upper Half Sensor Shell
110 Upper Half Concave Curved Interior Shell Surface
120 Upper Half Flat Facing Surface Edge
130 Upper Half Convex Curved Exterior Shell Surface
131 Upper Half Convex Curved Interior Shell Surface
140 Upper Half Upstream Sensor Pad
141 Upper Half Heater Pad
142 Upper Half Downstream Sensor Pad
150 Upper Half Sensor Shell Casing
170 Upper Half Upstream Temperature Sensor
171 Upper Half Heater Temperature Sensor
172 Upper Half Downstream Temperature Sensor
180 Upper Half Heater Element
200 Lower Half Sensor Shell
210 Lower Half Concave Curved Sensor Shell Interior Surface
220 Lower Half Flat Facing Surface Edge
230 Lower Half Convex Curved Sensor Shell Exterior Surface
231 Lower Half Convex Curved Interior Shell Surface
240 Lower Half Upstream Sensor Pad
241 Lower Half Heater Pad
242 Lower Half Downstream Sensor Pad
250 Lower Half Sensor Shell Casing
270 Lower Half Downstream Temperature Sensor
271 Lower Half Heater Temperature Sensor
272 Lower Half Upstream Temperature Sensor
280 Lower Half Heater Element
300 Portable Flow Rate Meter
310 Thermistor Electrical Leads
320 Heater and Electronics Cable
330 Measurement Electronics
340 External LCD Touchscreen Display
400 Upper & Lower Sensor Shells Clamped with Machine Screws/Bolts
410 Upper Sensor Shell Housing
420 Lower Sensor Shell Housing
430 Fasteners Such as Machine Screws/Bolts
440 Onboard Integrated LED Screen
445 Battery Cover
450 Upper Half Flexible Pad
460 Lower Half Flexible Pad
470 Charge Port
480 Flexible Pad Pliable Support FIG. 1 is a perspective (isometric) view of the handheld pivoting clamp assembly 1 in the closed position, with the jaws 100, 200 aligned but not engaged with any pipe. The assembly 1 includes upper and lower arms 10, 20 joined by a pivot pin 50 and spring 60. An integrated LCD screen 440 displays flowrate and related values, and a port 470 supports battery charging and USB data communication.

The interior of the jaws 100, 200 holds a two-piece sensor shell, which contains upper and lower flexible pads 450, 460 and flexible pad pliable support 480 that compress, expand or contract under clamp pressure to conform to a wide range of pipe sizes and are configured to maintain conformal contact with the pipe wall. The clamp structure enables one-handed operation and adapts to multiple pipe diameters.

Figure 1A:
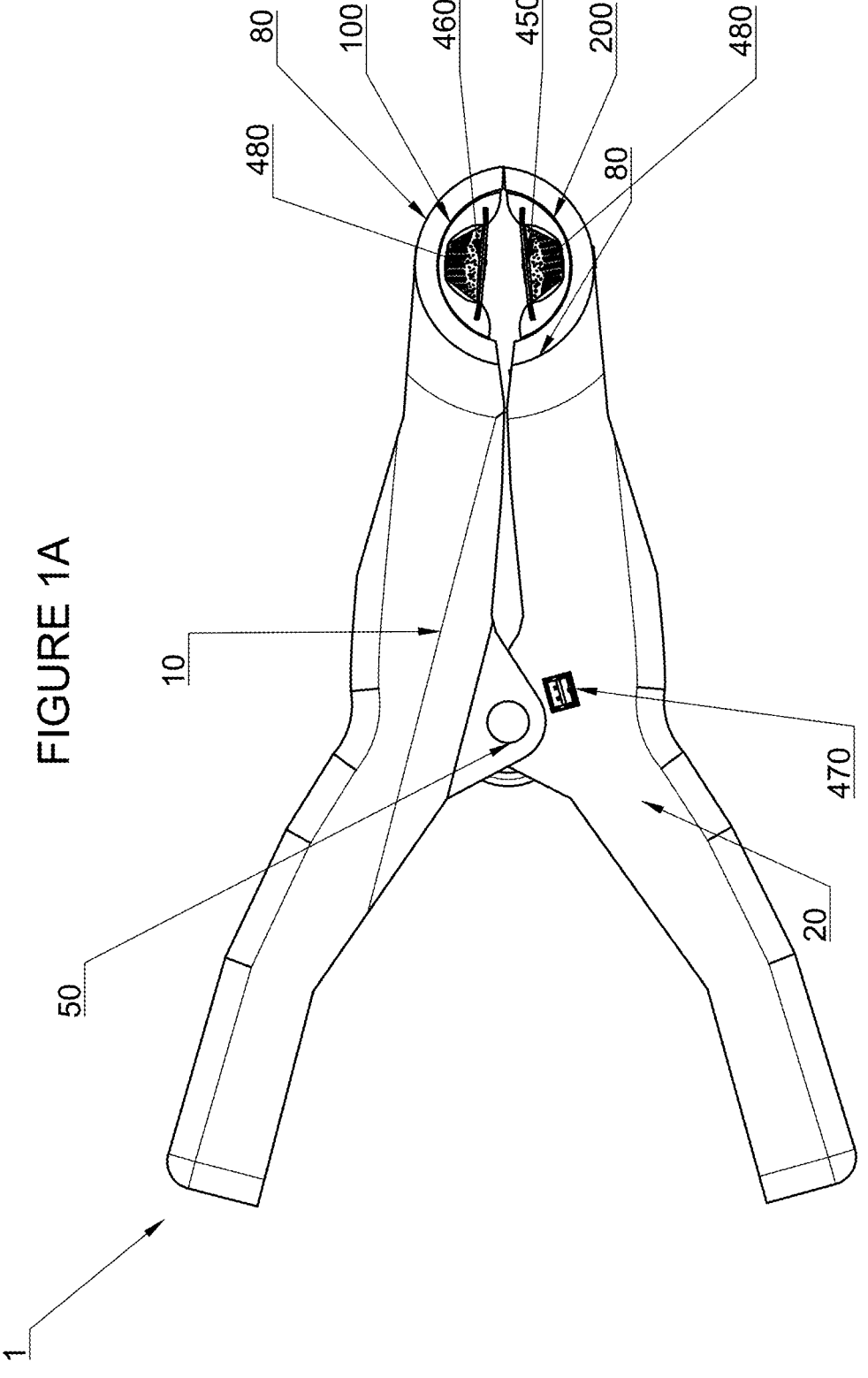
FIG. 1A is a right-side (orthographic) view of the clamp assembly shown in FIG. 1, illustrating the hinge pivot, clamp handles, and the contour of the internal sensor shells.

FIG. 1A is a right-side (orthographic) view of the clamp assembly 1 shown in FIG. 1, illustrating the hinge pivot 50, external thermal insulation 80, clamp handles 10, 20, and the contour of the internal sensor shell containing flexible pads 450, 460 and pliable support 480.

Figure 2:
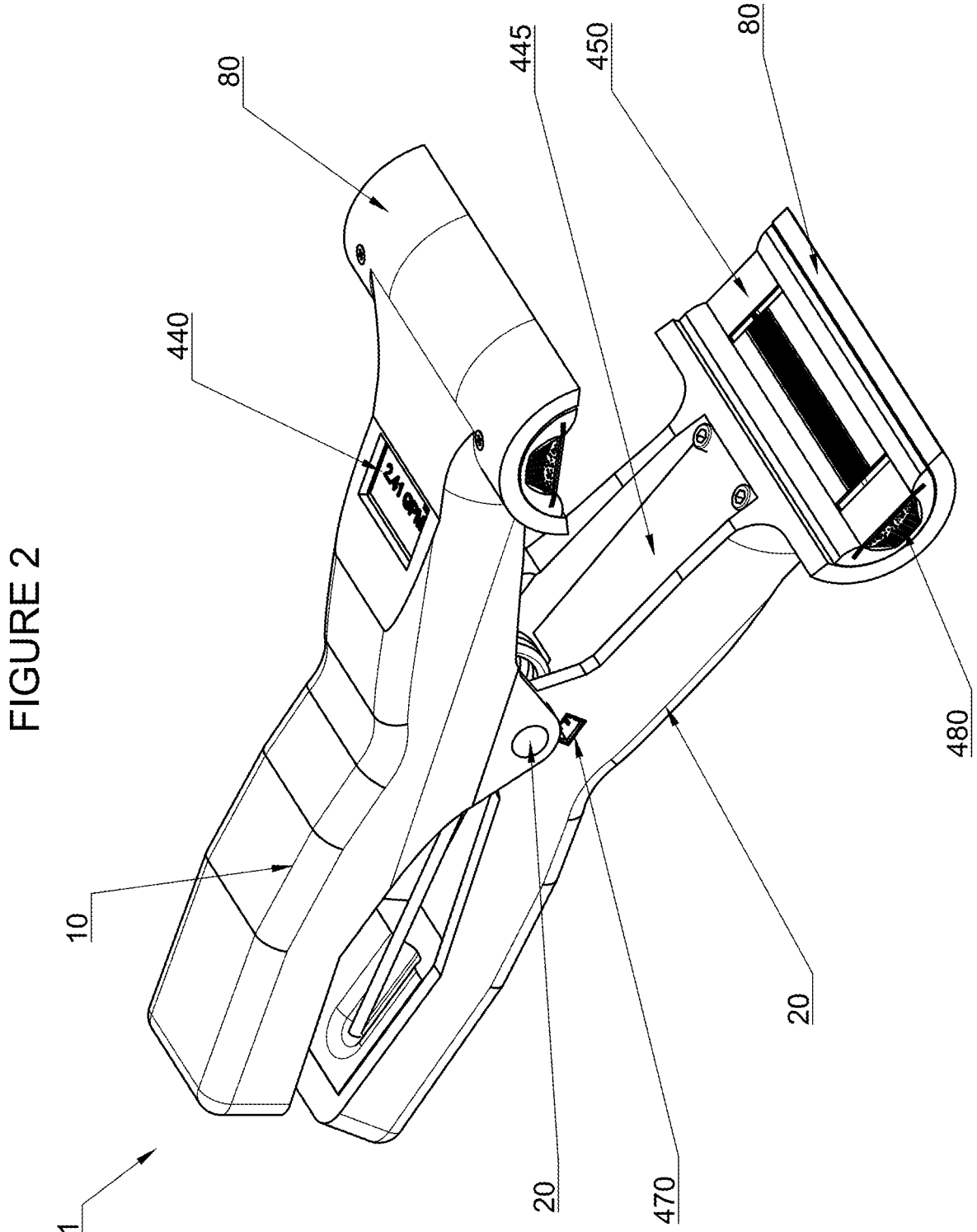
FIG. 2 is a perspective (isometric) view of the clamp assembly in a fully open position, ready to be placed onto a pipe. The pivot arc and internal shell positioning are shown.

FIG. 2 is a perspective (isometric) view of the clamp assembly 1 in a fully open position, ready to be placed onto a pipe. The pivot arc and internal shell positioning are shown.

Figure 2A:
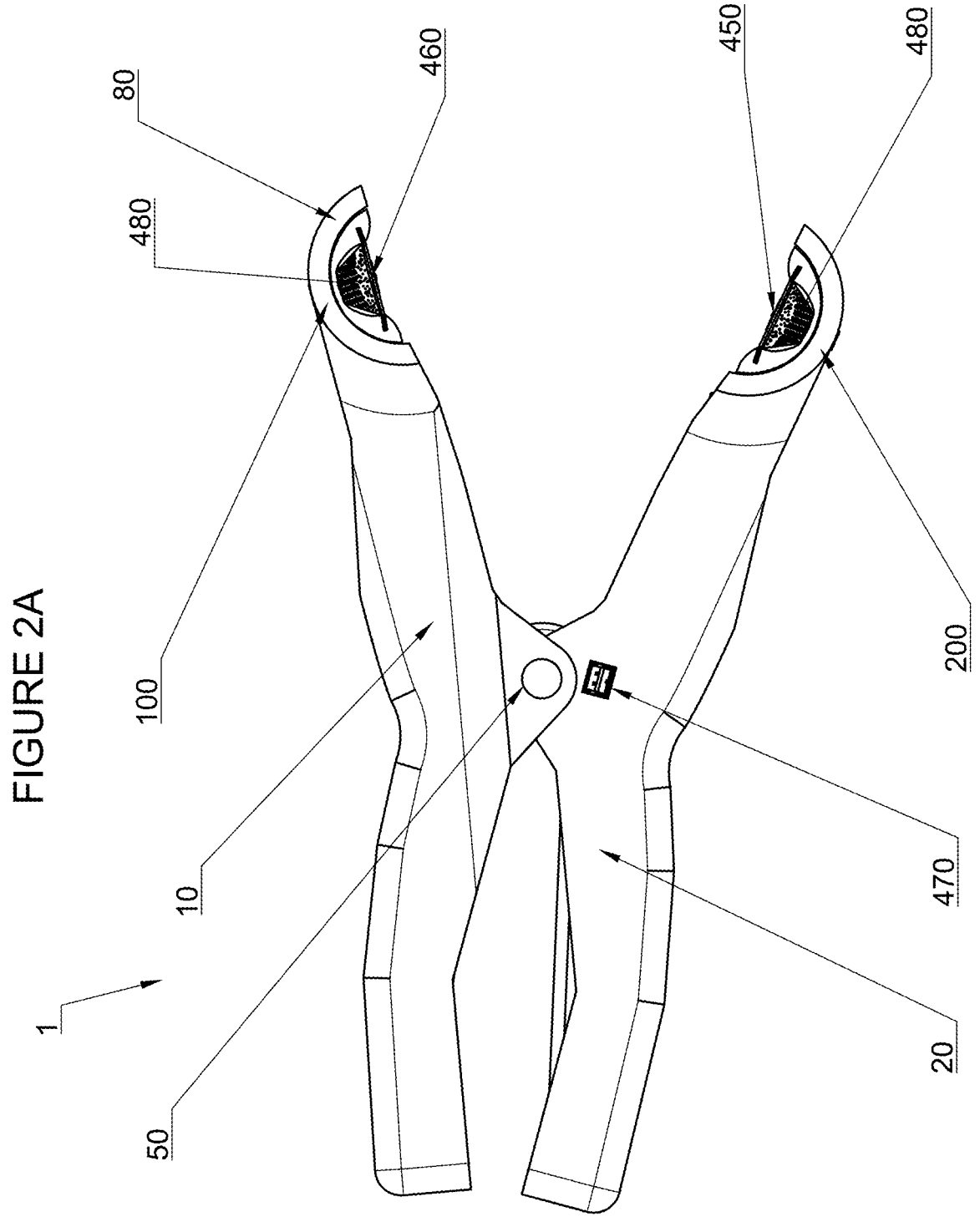
FIG. 2A is a right-side (orthographic) view of the open clamp assembly of FIG. 2.

FIG. 2A is a right-side (orthographic) view of the open clamp assembly 1 of FIG. 2.

Figure 3:
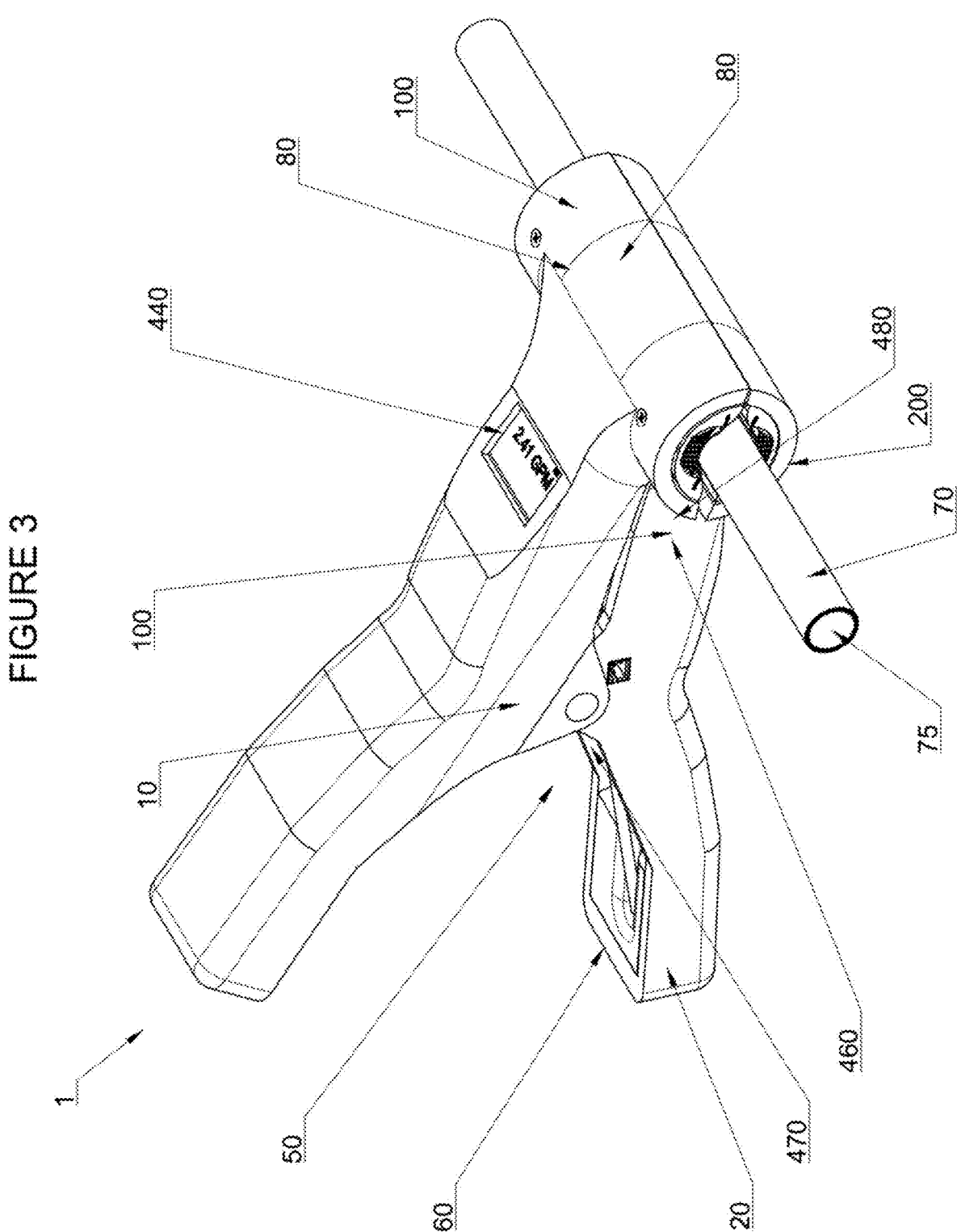
FIG. 3 is a perspective (isometric) view of the clamp assembly with the jaws closed about a cylindrical pipe. The flexible, conformal sensor shell contacts the pipe surface circumferentially, enabling precise thermal coupling for flow measurement.

FIG. 3 is a perspective (isometric) view of the clamp assembly 1 with the jaws 100, 200 closed about a cylindrical pipe 70 flowing fluid 75. The flexible, conformal sensor shell 100, 200 contacts the pipe surface 70 circumferentially, enabling precise thermal coupling for flow measurement.

Figure 3A:
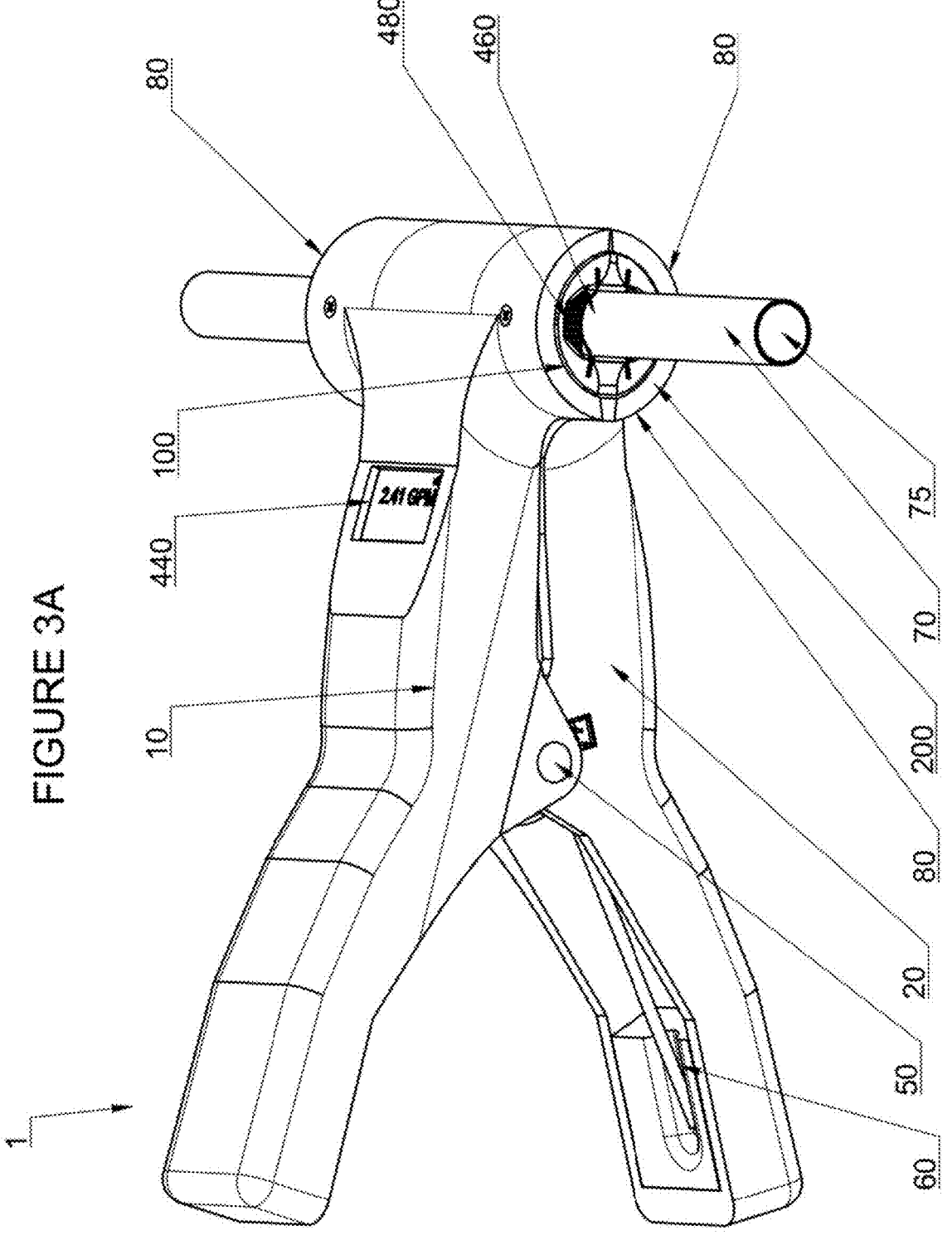
FIG. 3A is an upper-right perspective (isometric) view of the clamp assembly and engaged pipe from FIG. 3, showing the adaptive fit of the jaws and the self-aligning sensor shells in operational configuration.

FIG. 3A is an upper-right perspective (isometric) view of the clamp assembly 1 and engaged pipe 70 flowing fluid 75 from FIG. 3, showing the adaptive fit of the half shells 100, 200, the pad 460 and pliable support 480 in operational configuration.

Clamp Assembly and Structural Components

As shown in FIGS. 1-3A, the preferred embodiment includes a handheld pivoting clamp assembly 1 comprising an upper clamp arm 10 and a lower clamp arm 20 joined by a pivot point or hinge member 50. A spring mechanism 60 biases the arms toward a closed position, enabling quick one-handed operation. The handle ends of the arms 10, 20 can be contoured for ergonomic gripping by the user. These arms 10, 20 can be formed from injection-molded plastic, 3D-printed polymer, or similar durable material suitable for handheld field use. The internal surfaces of the clamp arms 10, 20 hold a two-piece sensor shell assembly comprising an upper sensor shell 100 and a lower sensor shell 200, best seen in FIGS. 3 and 4.

The clamp 1 is configured to wrap about a section of pipe, tube, or conduit 70, which carries a liquid or gas fluid medium (75) whose flow rate is to be measured. The gas medium to be measured, can include, but is not limited to refrigerant gas, nitrogen, oxygen, nitrous oxide, argon, helium, silane, or compressed air; or the liquid medium to be measured can include, but is not limited to refrigerant liquid, water, glycol, oils, acids, solvents, milk, syrups, or juices.

Figure 4:
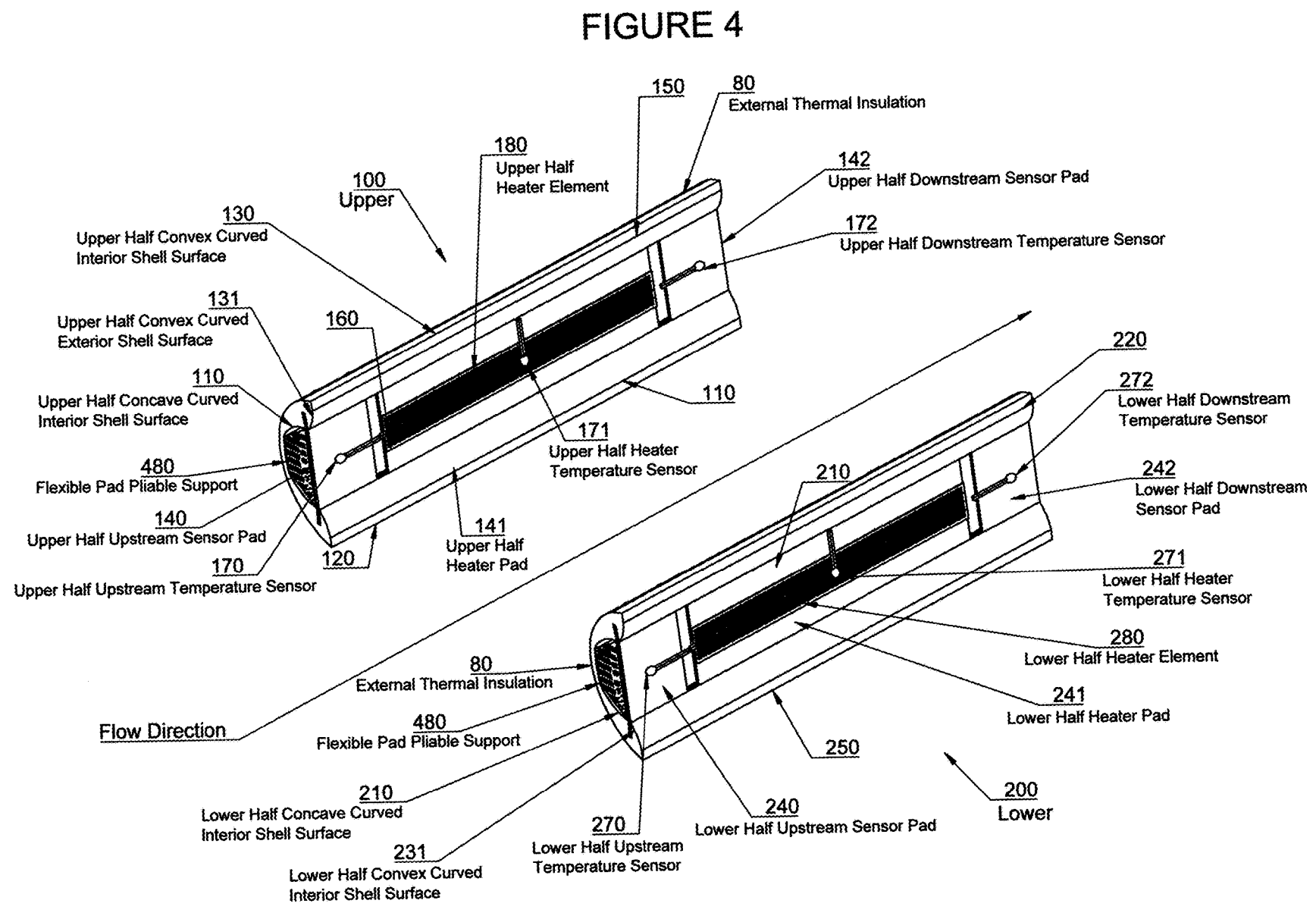

FIG. 4 is a perspective (isometric) view of the flexible upper half 100 and flexible lower half 200 of a sensor shell assembly, each having a convex outer surface 130, 230 and a concave interior surface 110, 210 with flexible contour that conforms to match any pipe curvature. Half-shells 100 and 200 include centrally located heater elements 180 and 280 and at least three temperature sensors 170, 171, 172; also shown are optional temperature sensors 270, 271, 272 distributed along the flow axis; upstream 170, 270; downstream 172, 272; and co-located with the heater 171, 271, configured to detect steady-state thermal gradients.

Figure 4A:
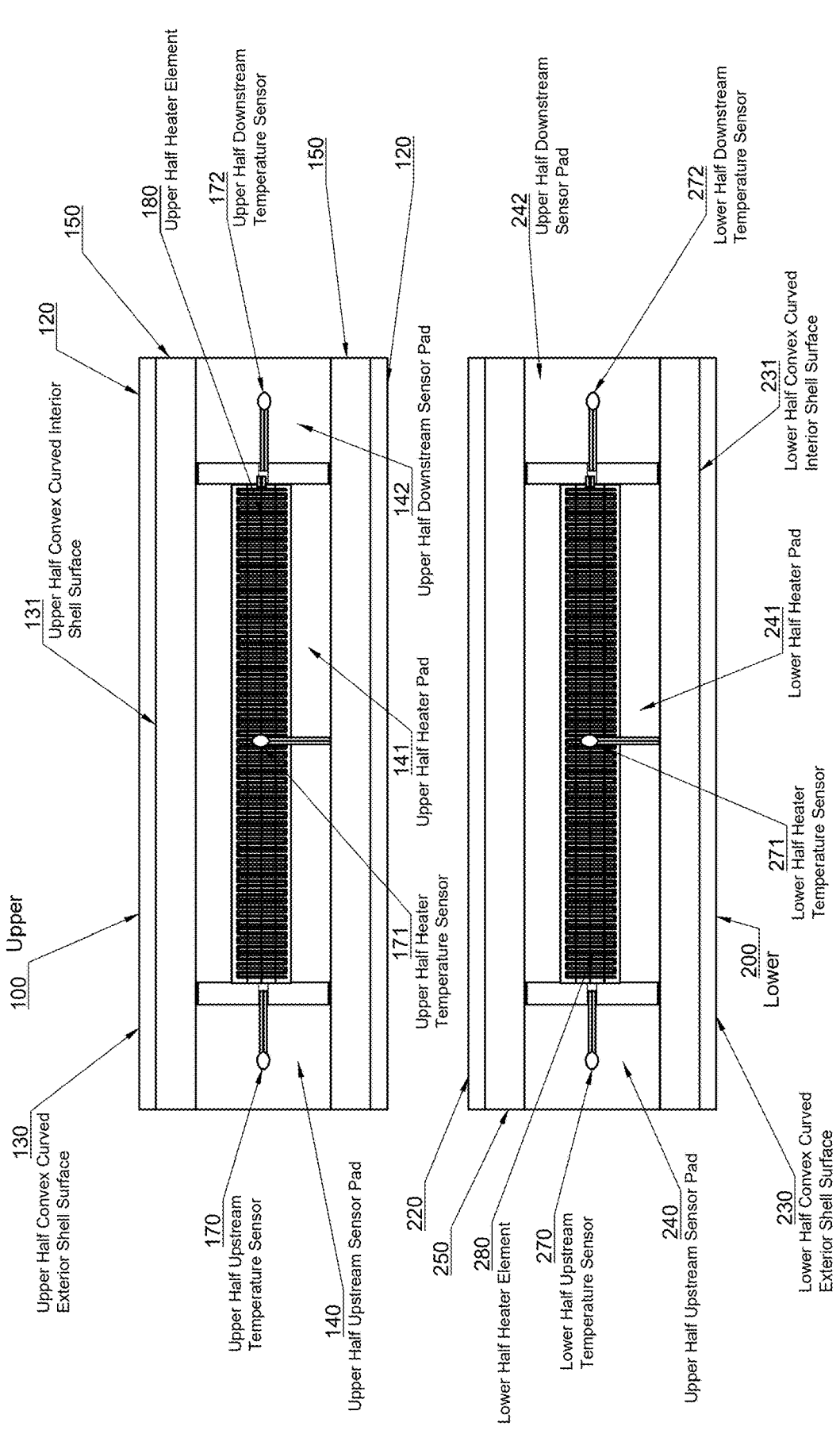
FIG. 4A is a back-side (orthographic) view of the upper and lower sensor shells of FIG. 4, illustrating mounting structures for the heater and sensors, as well as alignment features used during clamping.

FIG. 4A is a back-side (orthographic) view of the upper and lower flexible sensor shells 100, 200 of FIG. 4, illustrating mounting structures for the heater elements 180, 280 and sensor pads 140, 141, 142, and 240, 241, 242 as well as alignment surfaces 131 and 231 used for clamping. Pads 141, 241 support heater elements 180, 280 along with temperature sensors 171, 271.

Each flexible sensor shell 100, 200 includes a convex curved outer surface 130, 230 and a concave curved interior surface 110, 210 configured to conform to the curvature of the surface of any size pipe, and flat edge surfaces 120, 220 to enable aligned clamping. As shown in FIG. 4A, conformal sensor pads 140, 141, 142 and 240, 241, 242 maintain separation and alignment of temperature sensors 170, 171, 172 and 270, 271, 272 relative to each other and the heater element 180, 280.

Each shell 100, 200 is enclosed in a sensor shell casing 150, 250 and includes a heater pad 141, 241 to support and align the heater element 180, 280 and temperature sensor 171, 271. The shells 100, 200 can be surrounded by thermal insulation 80 to minimize heat loss and environmental interference. Thermal insulation 80 can include, but is not limited to polyethylene, phenolic or elastomeric foam, fiberglass, or polyisocyanurate.

Referring to FIGS. 1-4A, the sensor assembly 1 can be used by squeezing together the arms 10, 20 to spread the upper and lower shell halves 100, 200, positioning them around the pipe 70 flowing fluid 75, and clamping the housing so that the heater elements 180, 280 and sensor pads 140, 141, 142 and optionally 240, 241, 242 make snug, conformal contact with the exterior wall of the pipe 70. Temperature sensors 170, 171, 172 and optional temperature sensors 270, 271, 272 are also shown. Pads 141, 241 support heater elements 180, 280 along with temperature sensors 171, 271.

The conformal pliable pad 480 integrated into the sensor shells 100, 200 ensures continuous thermal contact on pipes 70 of varying diameters by compressing or expanding. Compliable pad 480 is composed of compressible elastic materials that can include but are not limited to elastomeric foam, nitrile rubber, and polyethylene foam.

Conformable pads 140, 141, 142, and 240, 241, 242 can be composed of materials, that can include, but are not limited to graphite sheet such as pyrolytic graphite (PG) or annealed pyrolytic graphite (APG); or copper, brass, aluminum or stainless-steel sheet metal; or silicone polymer composites.

As previously described, heater elements 180, 280 can include, but is not limited to conformable polyimide resistive film or magnetic induction heater element, having nominal power of 10 to 20 Watts per square inch, measuring approximately 2 inches by one-half inch, and powered by 12 to 28 volts AC or DC or 120 volts AC. As previously described, temperature sensors 170, 171, 172, and 270, 271, 272 can include, but is not limited to NTC $10k$ thermistors (Epoxy Type II or III) or $I^2C$ (Inter-Integrated Circuit) digital sensors, or similar temperature sensitive resistors or temperature responsive sensors, and sensor output can be analog resistance or digital data, as known in the art.

Figure 4B:
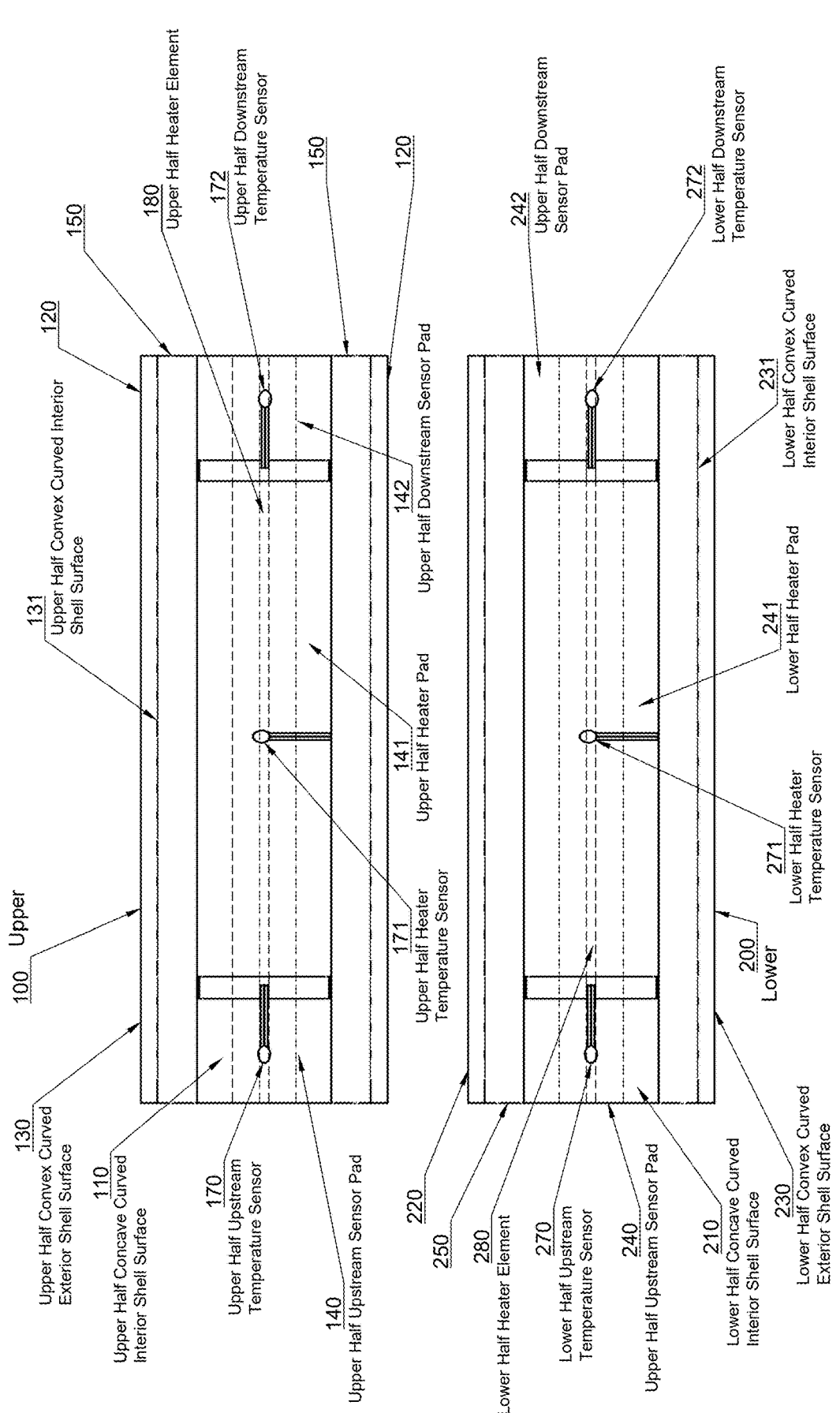
FIG. 4B is a pipe-side (orthographic) view of the sensor shells shown in FIGS. 4 and 4A. Hidden internal components such as the embedded heater and temperature sensors are shown in dashed lines. The layout provides directional thermal profiling along the pipe wall surface.

FIG. 4B is a pipe-side (orthographic) view of the sensor shells 100, 200 shown in FIGS. 4 and 4A. Hidden internal components such as the embedded heaters 180, 280, and sensor pads 140, 141, 142 and 240, 241, 242 are shown in dashed lines. Temperature sensors 170, 171, 172 and optional temperature sensors 270, 271, 272 are also shown. The layout provides directional thermal profiling along the pipe wall surface.

Two tables of critical specifications will now be presented: TABLE 1: Operational Specifications including flow rate measurement ranges, heater temperature and power ranges, and approximate time to steady-state; and TABLE 2: Physical Specifications, including approximate dimensions, weight range, and display size and resolution.

The two tables present specification values that define the functional and structural limits of the invention. These values are not arbitrary but correspond to critical design thresholds required for stable thermal contact, measurement sensitivity, and compact one-handed operation across a range of pipe diameters.

The operational specifications, such as flow rate measurement range (approximately 0.2 to approximately 20 GPM), heater power levels (approximately 10 to approximately 20 W), heater surface temperatures (approximately 48 to approximately 93° C.), and times to steady-state (approximately 3 to approximately 15 minutes), directly reflect the invention's ability to produce and detect stable thermal gradients for accurate flow calculation. The physical specifications, such as total device weight (less than approximately 1 pound or less than approximately 454 grams), shell dimensions, and integrated display resolution, demonstrate the critical compact, handheld form factor and usability in space-constrained field environments.

TABLE 1

| Operational Specifcations | | |
|---|---|---|
| | Approximately | |
| FLOW RATE RANGE | GPM | L/min |
| Minimum Nominal | 0.2 | 0.8 |
| Maximum Nominal | 20 | 75 |
| | Approximately | |
| HEATER | ° F. | ° C. |
| Temperature Range | 120 to 200 | 48 to 93 |
| | Approximately | |
| HEATER | inches | mm |
| Length | 2 to 2½" | 51-64 |
| Width | ½" | 12.7 |
| Thickness | 0.006-0.012 | 0.15-0.30 |
| Power | 10 to 20 | Watts |
| Flux Density | 10 to 20 | Watts/sqin |
| Current | 0.36-0.7 | Amps |
| Material | Polymide Acrylic | |
| | Approximately | |
| TIME TO STEADY-STATE | Nom Size | Minutes |
| | ¼" | 3.0 |
| | ⁵⁄₁₆" | 4.2 |
| | ⅜" | 6.0 |
| | ½" | 10.2 |
| | ⅝" | 14.6 |

TABLE 2

| Physical Specifications | | |
|---|---|---|
| | Approximately | |
| DIMENSIONS | inches | mm |
| Overall Width | 1.7 | 43 |
| Overall Length | 7.6 | 193 |
| Shell Width | 3.2 | 81 |
| Shell Length | 1.4 | 36 |
| Shell Diameter | 1.1 | 28 |
| Shell Closed Height | 1.2 | 30 |
| Shell Maximum Height | 4.9 | 124 |
| Sensor Spacing | 1.5 | 38 |
| WEIGHT | 6 to 16 oz | 170 to 454 g |
| BATTERY | Vdc | mAh |
| Electronics LiPo | 3.2 to 5.2 | 600 to 1000 |
| Heater LiFePo4 | 25.6 | 6000 |
| INTEGRATED DISPLAY | OLED | 0.96" |
| Pixels - Power | 128 × 64 | 0.08 W |
| EXTERNAL DISPLAY | LCD | 7.1" to 10.2" |
| Pixels - Power | 1280 × 1024 | 11 to 28 W |
| Luminance - Contrast | 600 to 1500 nits | 600:1 |
| THERMISTORS | Type II or III | 10 kΩ |

Figure 5:
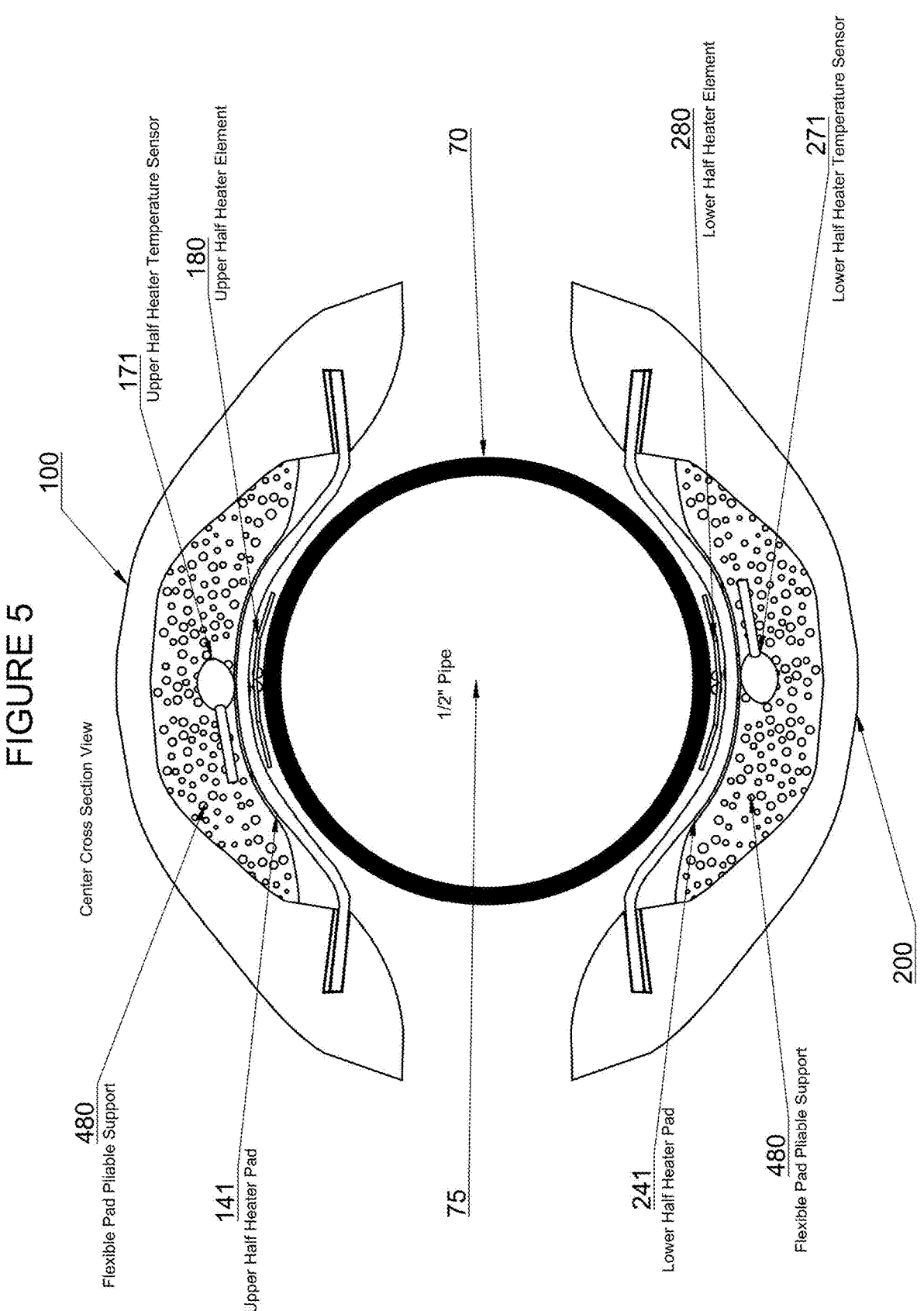
FIG. 5 is a partially exploded schematic end view of the sensor shells clamped about a large diameter pipe. The view shows heater elements, thermally conductive interface pads, and temperature sensors placed to monitor directional heat movement induced by convective cooling from fluid flow inside the pipe.

FIG. 5 is a partially exploded schematic center cross section of the flexible sensor shells 100, 200 clamped about a large (½" diameter) pipe 70 flowing fluid 75. The view shows heater elements 180, 280, thermally conductive sensor pads 141, 241, flexible pliable pad supports 480, and temperature sensors 171, 271 placed to monitor directional heat movement induced by convective cooling from fluid flow 75 inside the pipe 70.

Figure 5A:
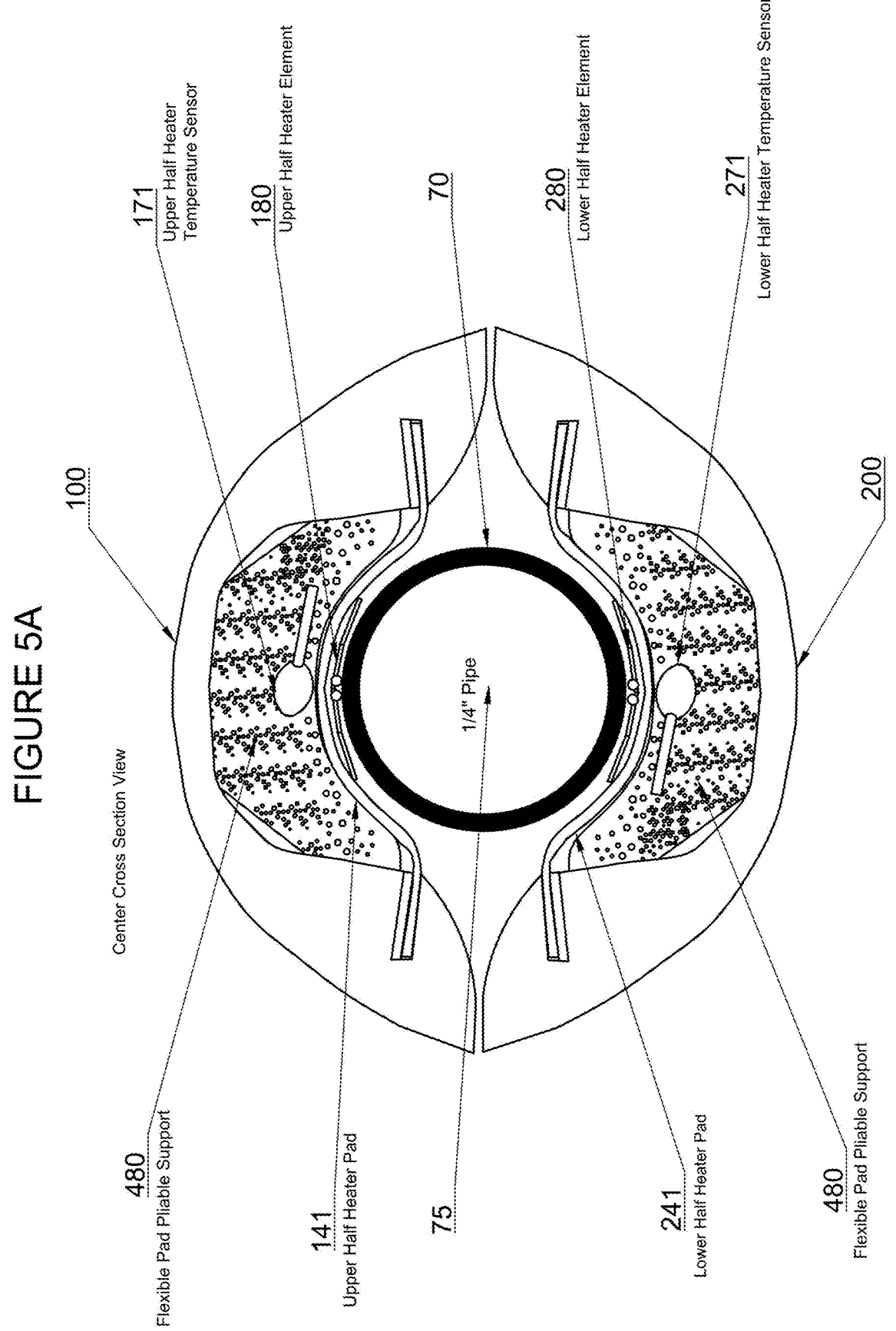
FIG. 5A is a partially exploded center cross section view of the sensor shells clamped about a small diameter pipe.

Similarly, FIG. 5A shows the flexible sensor shells 100, 200 of FIG. 5 clamped about a small (¼" diameter) pipe. Comparison of FIG. 5 with FIG. 5A shows how flexible pad pliable supports 480 are compressed from approximately 5 millimeters to 3 millimeters thick, sensor shells 100, 200 flex open from a width of approximately 16 millimeters to 22 millimeters under spring pressure, and the radius of curvature of pads 141, 241 along with heater elements 180, 280 flex from approximately 3 millimeters to 6 millimeters to accommodate the larger pipe size.

Sensor Configuration and Thermal Profiling

As shown in FIGS. 4-5, the sensor shells 100, 200 contain embedded heating elements and temperature sensing components. Each shell 100, 200 contains at least one heater element (180 in the upper shell, 280 in the lower shell) and at least three temperature sensors 170, 171, 172, with possible embodiments having up to six total sensors (270, 271, 272); for example, three per shell depending on the measurement configuration desired.

The heater elements 180, 280 raise the temperature of the pipe wall 70 locally at the point of measurement, while the flow of fluid 75 inside the pipe 70 convectively removes heat in the direction of flow. This results in a measurable temperature gradient along the outer pipe wall at the location of measurement. The temperature sensors 170, 171, 172 and optionally 270, 271, 272 are spaced along this direction and detect the resulting thermal profile. These sensors are located small distances apart (up to approximately 1.5 inches or up to approximately 38 millimeters) to minimize dimensions for compact overall assembly size while still resolving directional heat flow.

The temperature responsive sensors 170, 171, 172 and optionally 270, 271, 272 include, but are not limited to, NTC 10$k$ thermistors (Epoxy Type II or III) or I²C (Inter-Integrated Circuit) digital sensors, and sensor output can be analog resistance or digital data, as known in the art.

The heat-induced gradient typically reaches steady-state within approximately three to approximately fifteen minutes; depending on pipe size, after heater energization or following a significant change in fluid flow rate. Thermal mass and thus time to steady-state increases with pipe size, as listed in the Operational Specifications TABLE 1, for example for ¼" pipe, the time to steady-state is within approximately 3 minutes.

For ⅜" pipe, the time to steady state is within approximately 6 minutes.

For; ⅝" pipe, the time to steady state is within approximately 15 minutes.

Flexible sensor pads 140, 141, 142, and 240, 241, 242 align the sensors relative to each other and the heater elements 180, 280 to ensure precise thermal coupling between the sensor surface and the pipe wall.

Electronics and Signal Processing

Figure 6:
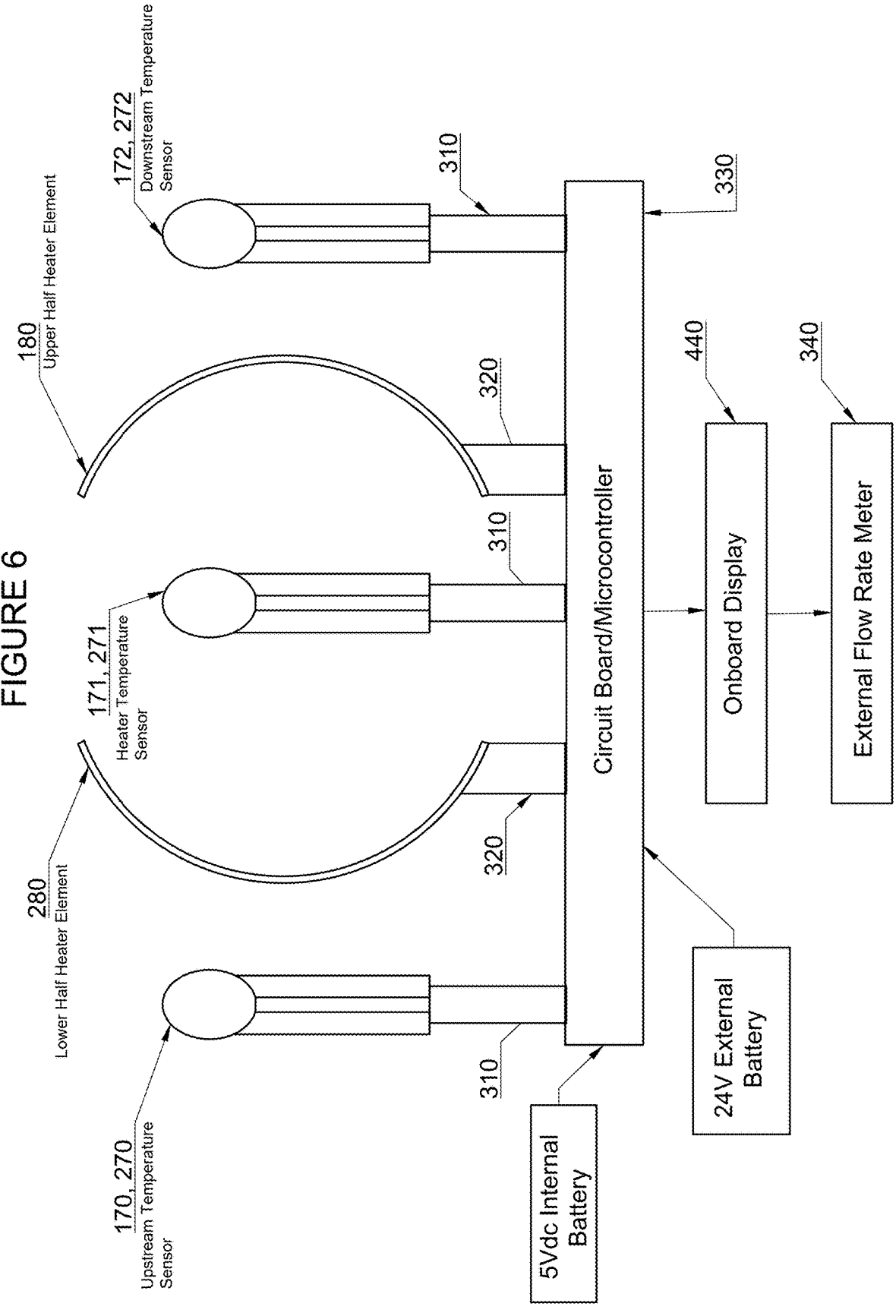
FIG. 6 is a schematic diagram of the electrical connections from the heater elements and temperature sensors of each shell half. The components feed into measurement electronics comprising a microcontroller, circuit board, signal conditioning, and display interface. The system supports both internal battery power and external supply options, enabling portable low-power operation.

FIG. 6 is a schematic diagram of the electrical connections from the heater elements 180, 280 and temperature sensors 170, 171, 172 and 270, 271, 272 of each shell half. These electronic components feed via wire leads 310, 320 into measurement electronics comprising a microcontroller 330, which includes a printed circuit board for signal conditioning, a processor for performing calculations and batteries/power supplies for portable field operation. An onboard display interface 440 integrated into the clamp handle shows fluid flow rate, temperatures, and calibration factors; and an external flow rate meter 340 displays, logs and charts fluid flow rate, temperatures and calibration factors. The system supports both internal battery power (5Vdc-nominal Internal Battery) and external supply options (24V-nominal External Battery), enabling portable low-power operation field operation away from line power.

Upper and Lower Half Heater Temperature Sensors 170, 171, 172, and 270, 271, 272 are connected by Thermistor Electrical Leads 310 to Circuit Board/Microcontroller 330. Upper and Lower Half Heater Elements 180, 280 are connected by Heater and Electronics Cable 320 to Circuit Board/Microcontroller 330.

As shown in FIG. 6, electrical leads 310, 320 from the temperature sensors 170, 172, 172, 270, 271, 272 and heaters 180, 280 are passed through a wiring harness into measurement electronics 330. The electronics 330 can include a microcontroller or embedded processor, signal conditioning circuitry, and an analog-to-digital converter (ADC) for resistance-based sensors or digital input logic for I²C-type sensors. Software running on the processor converts the sensor outputs to standard temperature units (° F. or ° C.) and calculates flow rate using empirically derived calibration algorithms. These can be tailored to the phase and properties of the fluid—gas or liquid—being measured. The system supports low power operation from an internal 5Vdc-nominal battery for integrated electronics and an external 24Vdc-nominal battery or supply to power the heater elements.

Figures 7, 8, 8A, 8B:
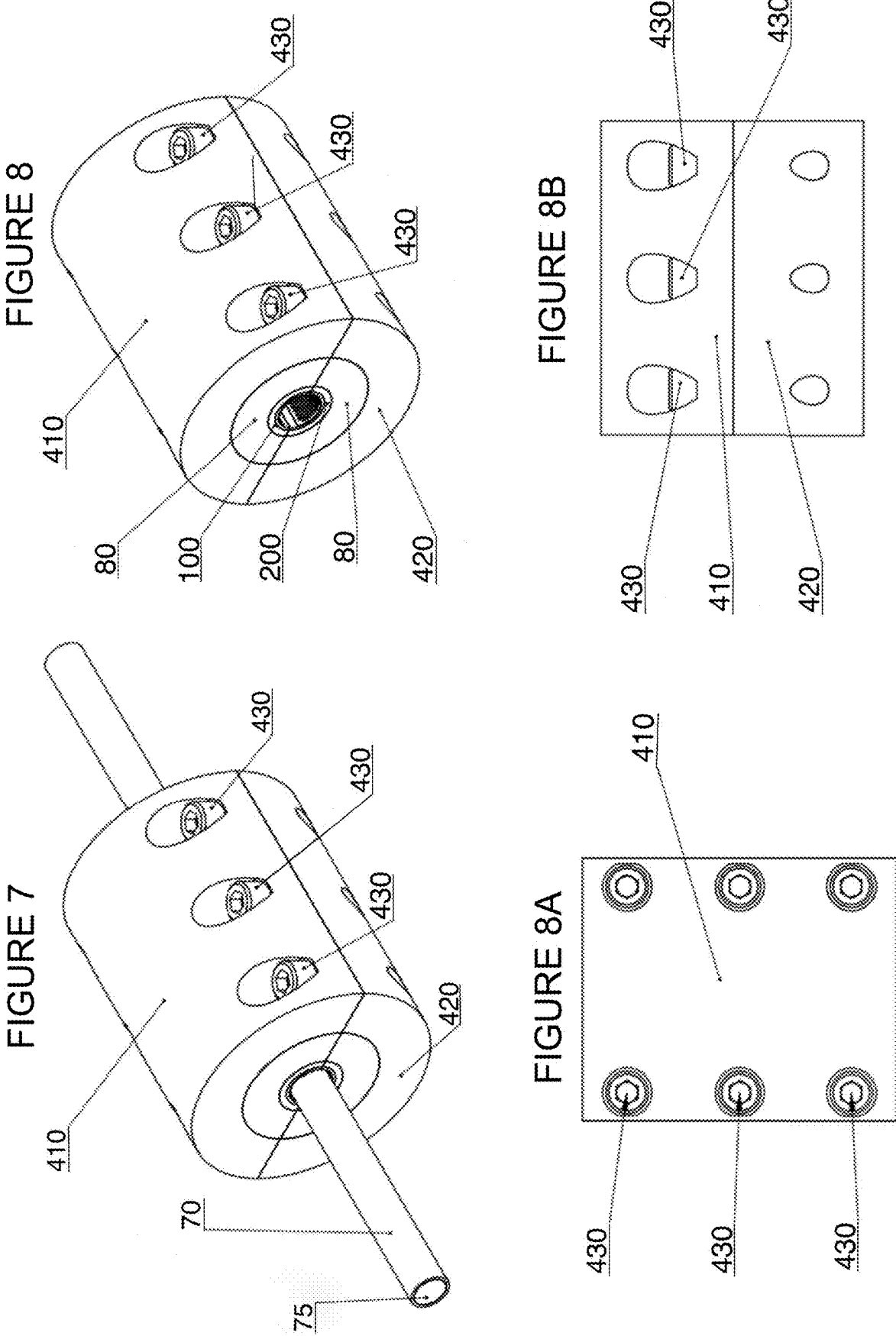
FIG. 7 is a perspective (isometric) view of an alternate embodiment of the sensor shell assembly without pivot arms, shown clamped onto a pipe. The two halves are fastened together using machine screws and contemplated for fixed installations where the portable clamp structure is not required.
FIG. 8 is a perspective (isometric) view of the alternate sensor shell embodiment of FIG. 7, shown assembled and not engaged with a pipe. Fastener bosses, gasket features, and the curved interior contact surfaces are visible.
FIG. 8A is a top (orthographic) view of the alternate two-piece sensor shell of FIG. 8, showing the shell geometry, mechanical fasteners, and alignment features.
FIG. 8B is a side (orthographic) view of the sensor shell shown in FIGS. 8 and 8A, illustrating vertical symmetry and the internal pipe-facing curvature.

FIG. 7 is a perspective (isometric) view of an alternate embodiment of the sensor shell assembly 1 without pivot arms 10, 20, shown clamped about a pipe 70 flowing fluid 75. The two halves 410, 420 are fastened together using machine screws 430 and contemplated for fixed installations where the portable clamp structure 1 is not required.

FIG. 8 is a perspective (isometric) view of the alternate sensor shell embodiment of FIG. 7, shown assembled and not engaged with a pipe 70. Fastener bosses, gasket features, and the curved interior contact surfaces are visible. Sensor shells 100, 200 with thermal insulation 80 in this embodiment is internal to the assembly housing 410, 420 for structural support and physical protection from the environment.

FIG. 8A is a top (orthographic) view of the alternate two-piece sensor shell 410 of FIG. 8, showing the shell geometry, mechanical fasteners 430, and alignment features.

FIG. 8B is a side (orthographic) view of the sensor shell 410, 420 shown in FIGS. 8 and 8A, illustrating vertical symmetry and the internal pipe-facing curvature, with fasteners 430.

The alternate embodiment shown in FIGS. 7-8B, is where the sensor shell halves 410, 420 are assembled without clamp arms. In this configuration, the shells 410, 420 are manually affixed about the pipe using machine screws 430 and aligned via molded-in alignment pins and mating holes. Fastener bosses provide screw anchoring. This form contemplates permanent installations where pivoting arms are unneeded or impractical due to space constraints.

Display and User Interface

Figure 9:
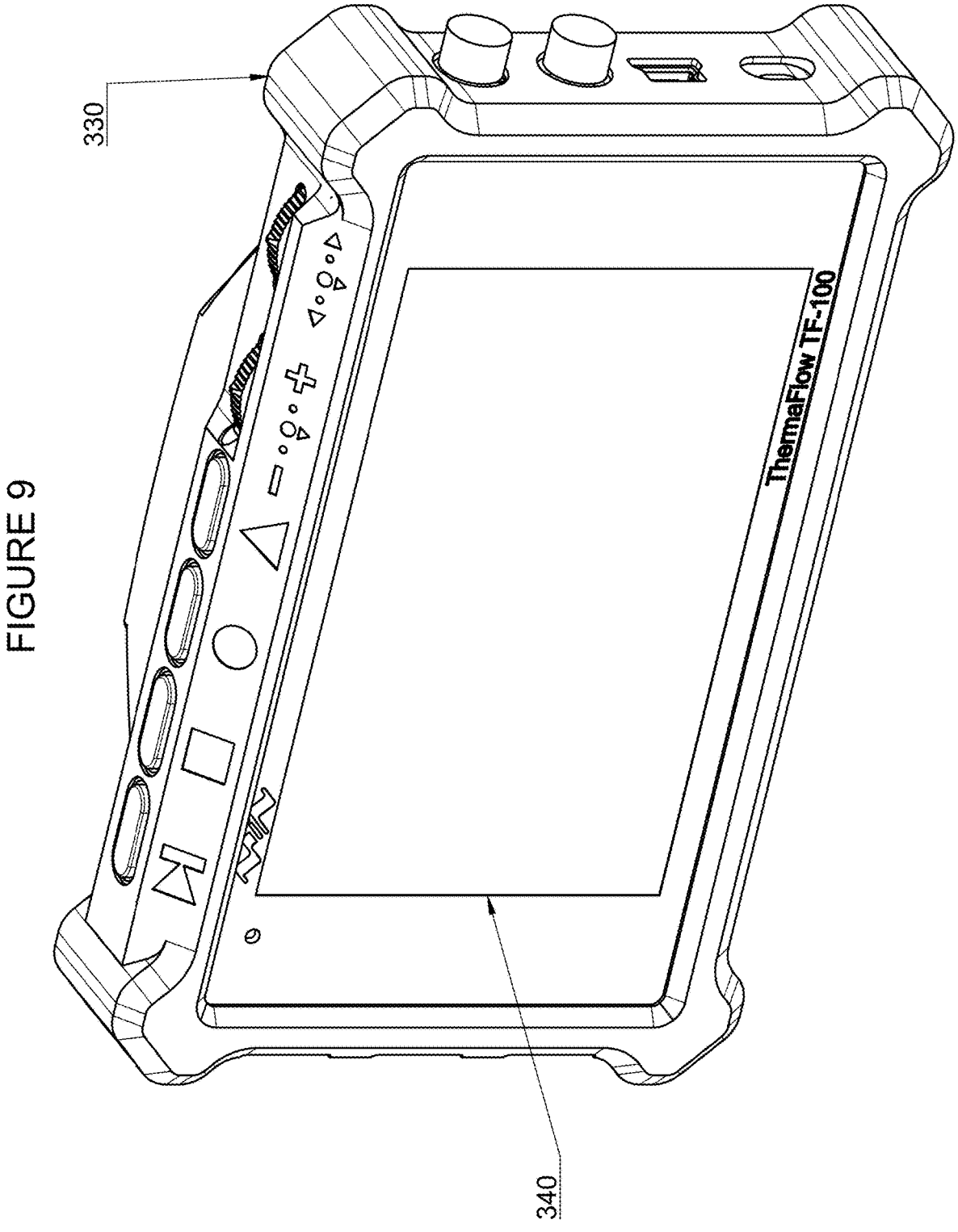
FIG. 9 is a perspective (isometric) view of a portable flow rate meter/computer containing measurement electronics and a touchscreen display. The housing includes ports for sensor connections, a rechargeable battery compartment, and optional wireless communication modules such as Bluetooth for external integration.

FIG. 9 is a perspective (isometric) view of an external portable flow rate meter 340 containing measurement electronics 330 and a touchscreen display. The housing includes ports for sensor connections, a rechargeable battery compartment, and optional wireless communication modules including but not limited to WiFi or Bluetooth for external network or cloud integration.

Figure 10:
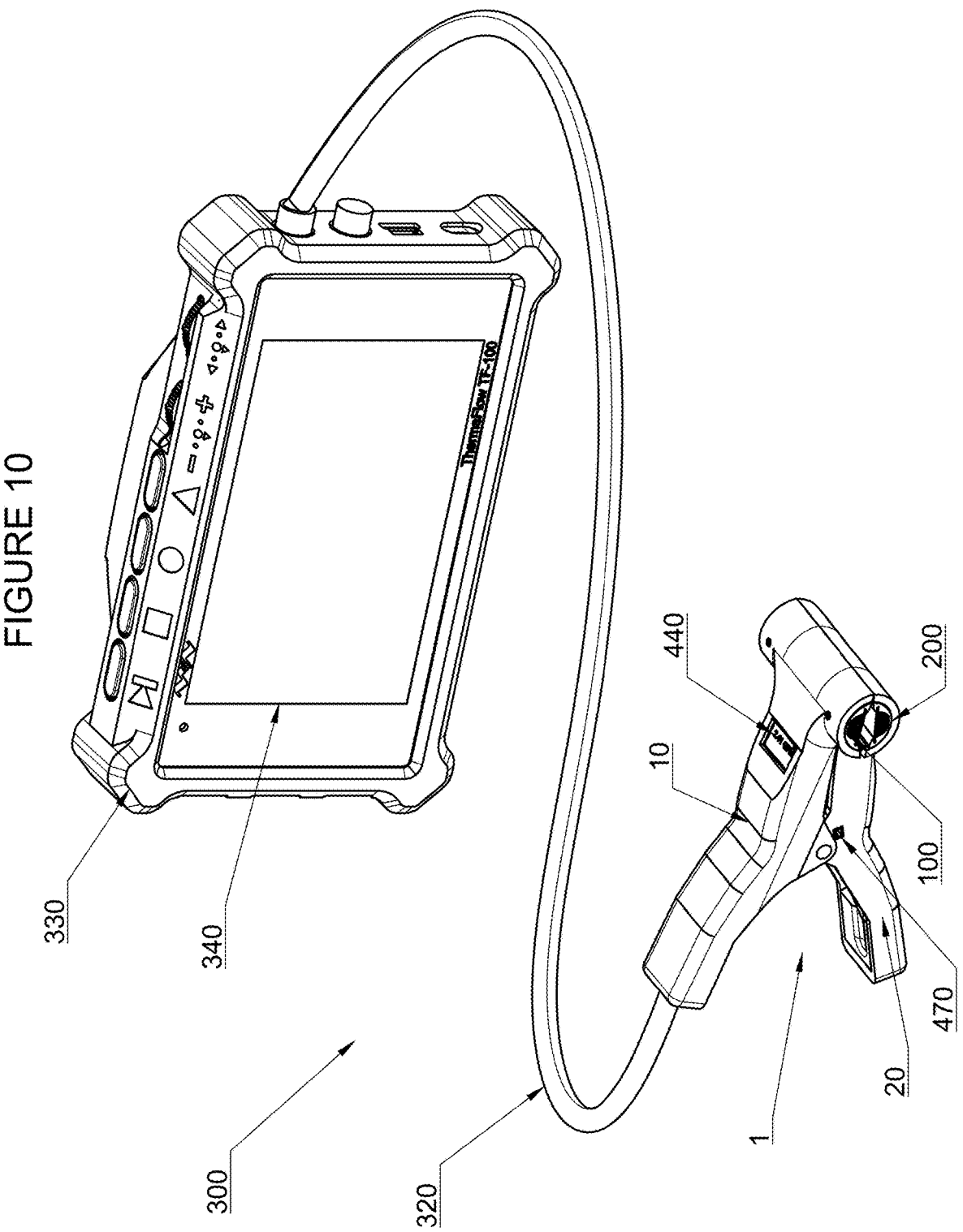
FIG. 10 is a perspective (isometric) view of the portable flow rate meter/computer connected to the handheld clamp assembly shown in FIG. 1 via an electrical cable.

FIG. 10 is a perspective (isometric) view of the portable flow rate meter system 300 with external flow rate meter 340 having LCD (liquid crystal display) screen connected to the handheld clamp assembly 1 shown in FIG. 1 with clamp arms 10, 20, integrated display 440, and shells 100, 200 via an electrical cable 320, with a charge port 470 for the clamp assembly 1.

Figure 11A:
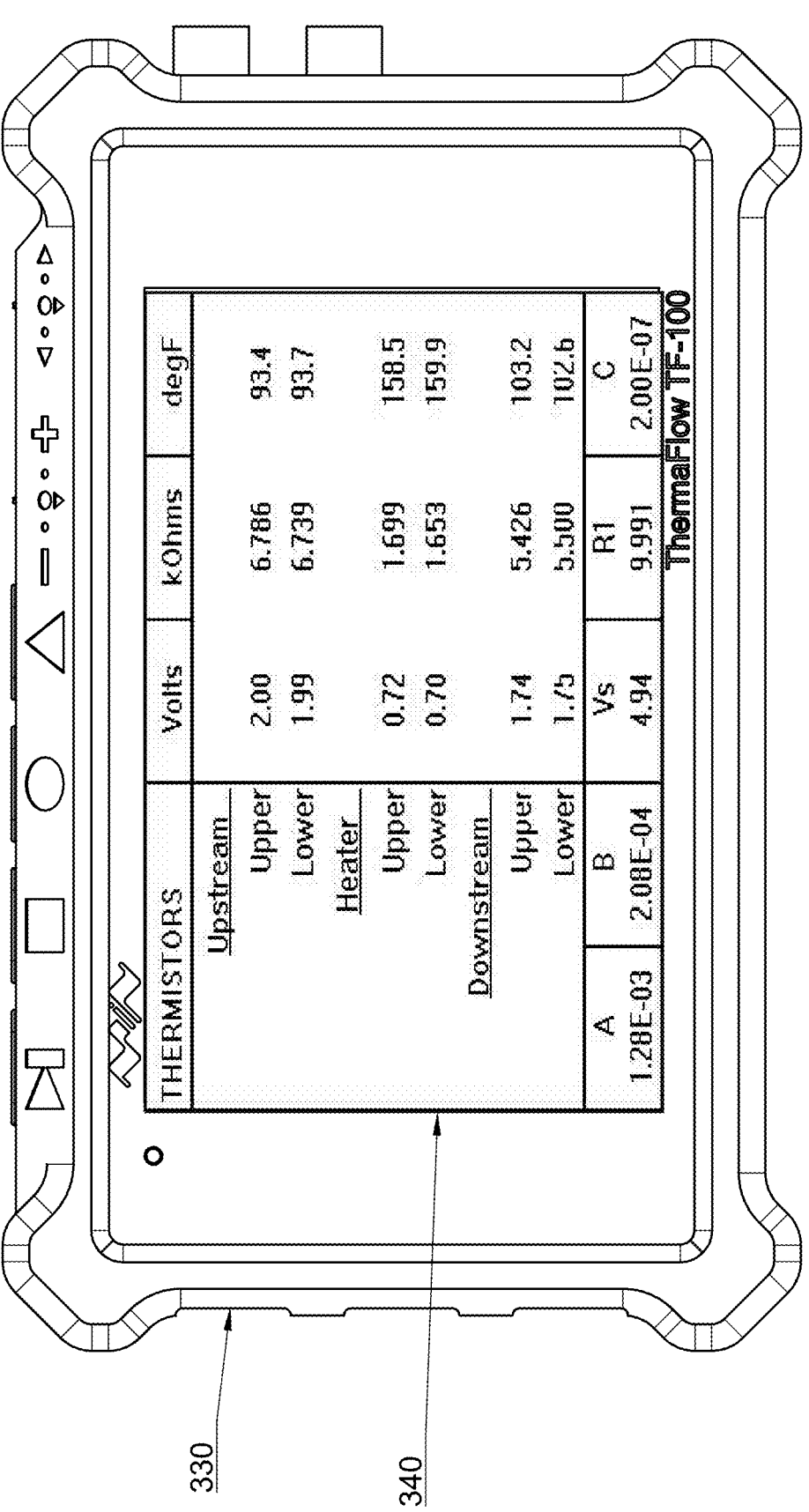
FIG. 11A is a front view of the display screen of the flow rate meter/computer, showing real-time data for upstream, heater, and downstream temperatures. The processor computes temperature gradients to deduce flow rate and fluid direction.

FIG. 11A is a front view of the display screen 340 for the flow rate electronics 330 showing real-time data for upstream, heater, and downstream temperatures. The processor computes temperature gradients to deduce flow rate and fluid direction.

Figure 11B:
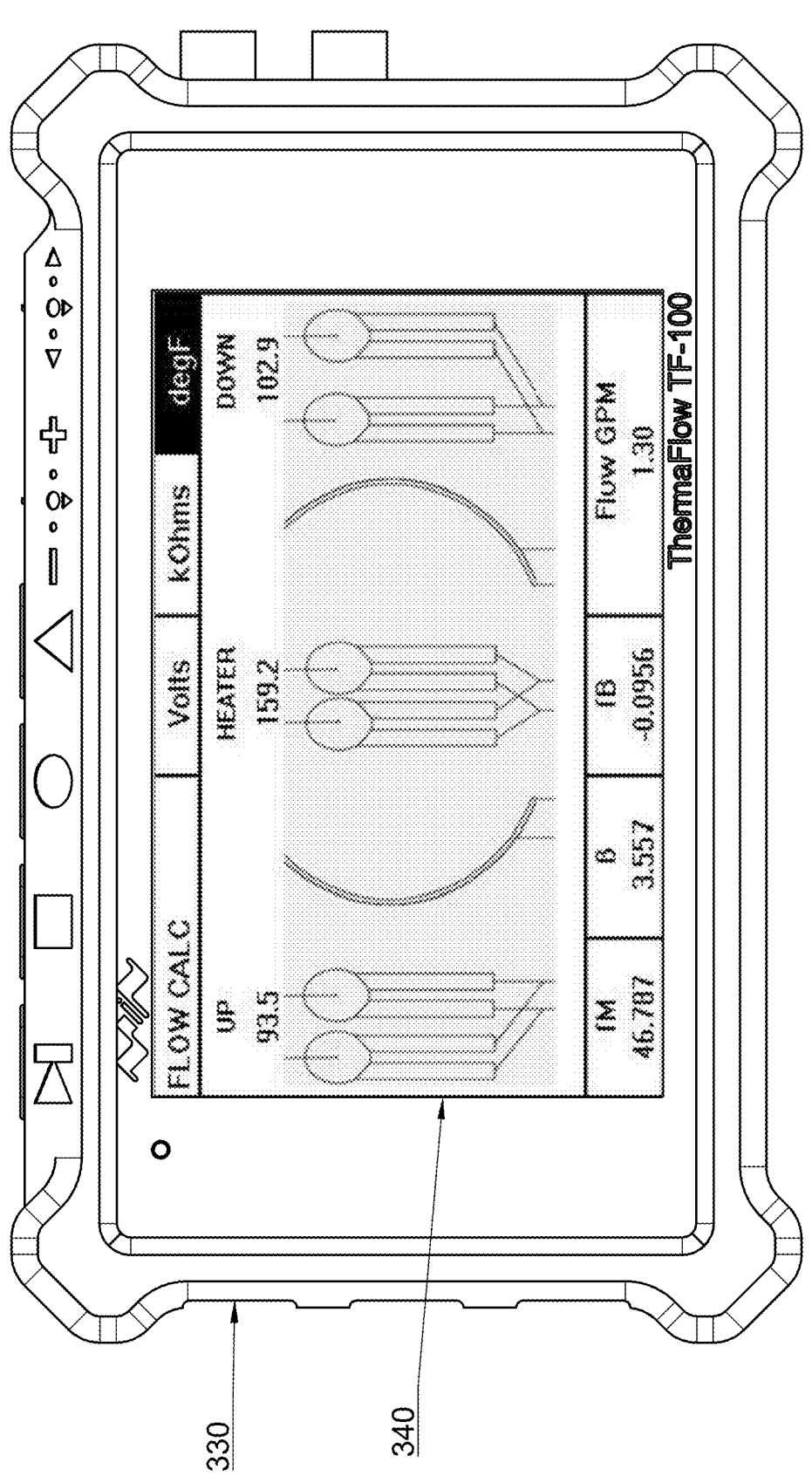
FIG. 11B is a front view of the display screen of the flow meter/computer, showing calculated flow rate in gallons per minute (GPM), temperature differentials, and empirical calibration factors used in the flow model.

FIG. 11B is a front view of the display screen 340 for the flow electronics 330, showing calculated flow rate in gallons per minute (1.30 GPM, bottom right of screen), temperatures (93.5, 159.2, 102.9 degF, top of screen), and empirical calibration factors (fM 46.787, β 3.557, fB −0.0956, bottom of screen) from the flow model computations.

Figure 11C:
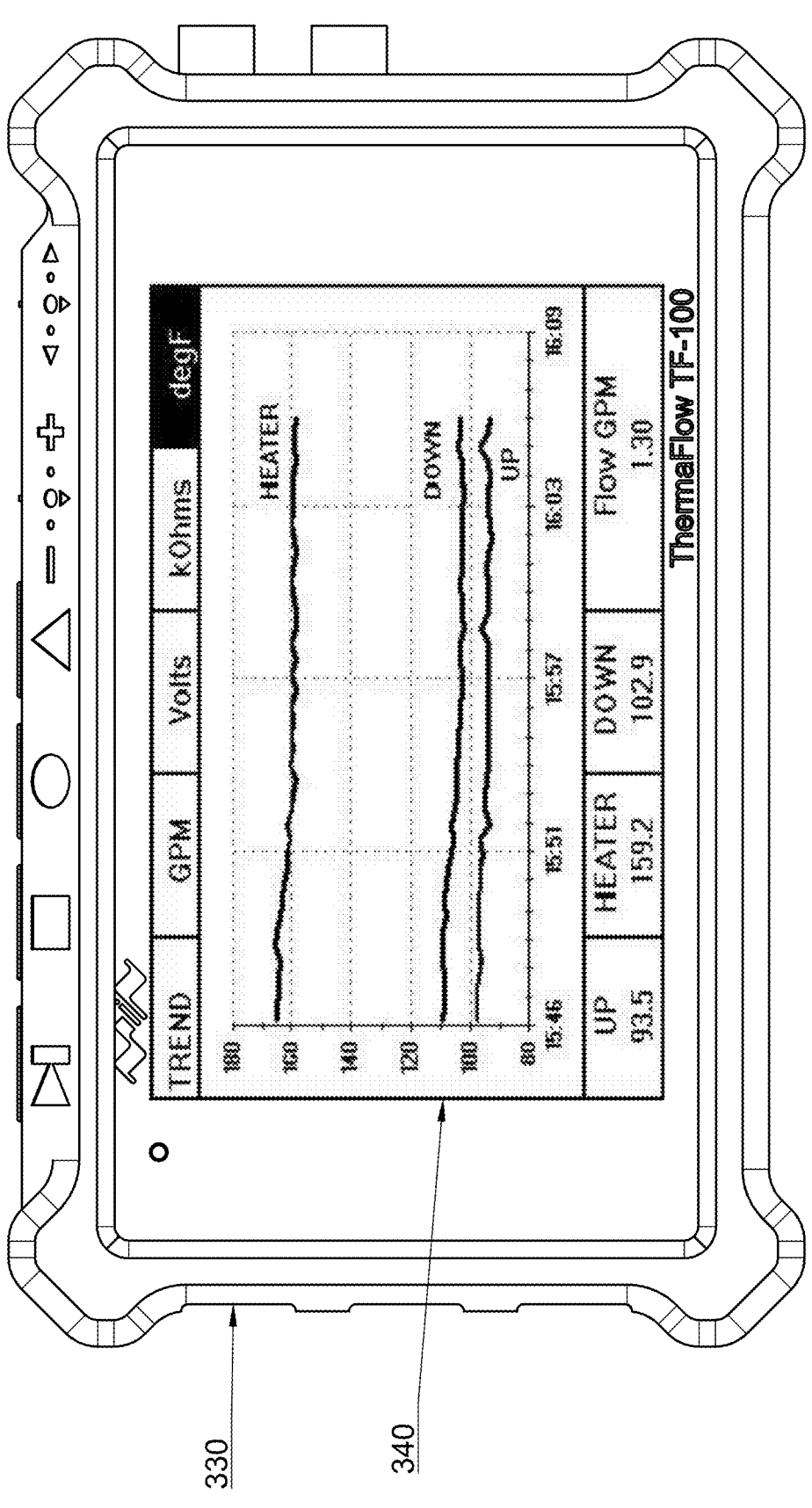
FIG. 11C is a front view of the display screen of the flow meter/computer, showing time-series charts plotting temperature and flow data over time. The display includes instantaneous values and rolling average calculations.

FIG. 11C is a front view of the display screen 340 of the flow electronics 330, showing time-series charts plotting temperature, flow, volts or resistance (kΩ) data over time. The display includes instantaneous values and rolling average calculations.

Referring to FIGS. 9-11C, measurement data can be displayed on an integrated screen 440 mounted to the clamp handle assembly 1 and on an external meter 340. The user interface shows: upstream, heater, and downstream temperatures, FIG. 11A, or optionally thermistor resistance (kΩ) or voltage; flow rate in mass (lbm/min, kg/min) and/or volume (GPM, L/s) units, FIG. 11B, and time-series plots of measured data over time FIG. 11C. Flow calculation correlation and calibration value fM (proportional parameter), β(power parameter), and fB (offset parameter) are shown at the bottom of the screen, FIG. 11B.

While the clamp assembly is shown attached to an external meter/computer display 330 by a cable 320, the clamp assembly 1 can be connected to a smart phone or computer tablet by wireless Bluetooth or WiFi connection, where the smart phone or computer tablet can be used to display, chart and log all data including but not limited to the flow rate (GPM or L/min), temperatures (F or C), voltages, resistance (kΩ), and calibration values fM, β, fB.

The term "approximately"/" approximate" can be +/−15% of the amount referenced. Additionally, preferred amounts and ranges can include the amounts and ranges referenced without the prefix of being approximately.

While the drawings show the pipes and conduits can have cylindrical cross-sections, the pipes and conduits can have any cross-sectional shape.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A non-intrusive thermal flow measurement device for quantitatively determining fluid flow in a conduit, comprising:
    a flexible clamp structure configured to externally conform to and maintain continuous circumferential thermal contact with conduits of varying diameters without requiring interchangeable inserts;
    at least one heater configured to provide a heat flux of approximately 10 Watts per square inch to approximately 20 Watts per square inch, the heater configured to externally heat only a portion of a conduit wall at a measurement location, without directly heating bulk fluid inside the conduit wall, thereby avoiding vaporization and enabling portable, battery-powered operation;
    a plurality of temperature sensors positioned along the conduit wall and configured to measure temperature differentials between multiple distinct points along the conduit wall; and
    an electronic processor configured to calculate and determine a fluid flow rate in the conduit based on steady-state temperature differentials which are the temperature differentials measured by said sensors when the temperature differentials have reached a steady-state within a time of approximately 3 minutes to approximately 15 minutes.

2. The device of claim 1, wherein the flexible clamp structure comprises two half-shells configured to flexibly adapt and snugly conform to conduit diameters between a range between approximately ¼ inch to approximately ⅝ inch.

3. The device of claim 1, wherein the plurality of temperature sensors includes at least one sensor positioned upstream of the heater, at least one sensor positioned directly on the heater, and at least one sensor positioned downstream of the heater.

4. The device of claim 1, further comprising a communication medium configured to transmit measured temperature and flow rate data through a wired connection.

5. The device of claim 1, further comprising a communication medium configured to transmit measured temperature and flow rate data through at least one wireless connection selected, from the group consisting of Bluetooth, Wi-Fi Direct, NFC, Zigbee, and Z-Wave.

6. The device of claim 1, further comprising:
    a digital display integrated directly into the clamp structure, configured to locally display measured temperatures and calculated fluid flow rates without requiring an external meter.

7. The device of claim 1, wherein the calculation of the fluid flow rate is performed empirically from said steady-state temperature differentials by using calibration constants specific to fluid phases, thereby enabling the determination of a fluid flow of either a gas or a liquid in the conduit using same sensor configuration.

8. The device of claim 2, wherein for an approximately ¼" pipe, the time frame is within approximately 3 minutes.

9. The device of claim 2, wherein for an approximately ⅜" pipe, the time frame is within approximately 6 minutes.

10. The device of claim 2, wherein for an approximately ⅝" pipe, the time frame is within approximately 15 minutes.

11. The device of claim 2, wherein overall weight of the device is up to approximately 1 pound or approximately 454 grams, overall length of the device is up to approximately 7.6" or approximately 193 millimeters, and overall width of the device is up to approximately 1.7" or approximately 43 millimeters.

12. The device of claim 2, wherein spacing between adjacent sensors is up to approximately 1.5 inches or 38 millimeters.

13. The device of claim 2, wherein an upper half-shell of the two half-shells, includes:
    an upper flexible pad pliable support between the upper half-shell and an upper half heater temperature sensor, and an upper half heater pad between the upper half heater temperature sensor and an upper half heater element, and
    wherein a lower half-shell of the two half shells includes
    a lower flexible pad pliable support between the lower half-shell and lower half-heater temperature sensor, and a lower half heater pad between the lower half heater temperature sensor and a lower half heater pad between the lower half heater temperature sensor and a lower half heater element.

14. The device of claim 1, wherein the flexible clamp structure includes:
    an upper arm having a grip end and a distal end with a concave lower surface;
    a lower arm having a grip end and a distal end with a concave upper surface;
    a spring-loaded member for allowing the upper arm to pivot relative to the lower arm, wherein the concave lower surface on the distal end of the upper arm and the concave upper surface on the distal end of the lower arm grip about a conduit wall.

15. The device of claim 1, wherein the flexible clamp structure includes a fixed mechanical clamp assembly that includes:
    an upper shell having a lower facing concave surface; and
    a lower shell having an upper facing concave surface, wherein the upper shell and the lower shell wrap about a section of the conduit wall.

16. The device of claim 15, wherein the fixed mechanical clamp assembly includes:
    fasteners selected from at least one of screws and bolts for locking the upper shell to the lower shell.

17. The device of claim 16, wherein the fixed mechanical clamp assembly includes:
    securing members selected from at least one of: magnets, latches, ties, spring clips, and latch clamps for securing the upper shell to the lower shell.

18. A non-intrusive thermal flow measurement device for quantitatively determining fluid flow in a conduit, comprising:
    a flexible clamp structure configured to externally conform to and maintain continuous circumferential thermal contact with conduits of varying diameters without requiring interchangeable inserts, the flexible clamp structure comprises two half-shells configured to flexibly adapt and snugly conform to conduit diameters between a range between approximately ¼ inch to approximately ⅝ inch, wherein the flexible clamp structure includes an upper arm having a grip end and a distal end with a concave lower surface, and a lower arm having a grip end and a distal end with a concave upper surface, and a spring loaded member for allowing the upper arm to pivot relative to the lower arm, wherein the concave lower surface on the distal end of the upper arm and the concave upper surface on the distal end of the lower arm grip about conduit wall;

at least one heater configured to provide a heat flux of approximately 10 Watts per square inch to approximately 20 Watts per square inch, the heater configured to externally heat only a portion of the conduit wall at a measurement location, without directly heating the bulk fluid inside the conduit wall, thereby avoiding vaporization and enabling portable, battery-powered operation;

a plurality of temperature sensors positioned along the conduit wall and configured to measure temperature differentials at distinct points along the conduit wall, the plurality of temperature sensors includes at least one sensor positioned upstream of the heater, at least one sensor positioned directly on the heater, and at least one sensor positioned downstream of the heater, wherein spacing between adjacent sensors is approximately 1.5 inches or 38 millimeters;

wherein an upper half-shell of the two half-shells, includes:

an upper flexible pad pliable support between the upper half-shell and an upper half heater temperature sensor, and an upper half heater pad between the upper half heater temperature sensor and an upper half heater element, and wherein a lower half-shell of the two half shells includes;

a lower flexible pad pliable support between the lower half-shell and lower half-heater temperature sensor, and a lower half heater pad between the lower half heater temperature sensor and a lower half heater element:

and an electronic processor configured to calculate and determine a fluid flow rate in the conduit based on steady-state temperature differentials which are the temperature differentials measured by said sensors when the temperature differentials have reached a steady state within a time frame of approximately 3 minutes to approximately 15 minutes, wherein overall weight of the device is up to approximately 1 pound or approximately 454 grams, overall width of the device is approximately 1.7 inches or approximately 43 millimeters, and overall length of the device is approximately 7.6 inches or approximately 193 millimeters.

19. A non-intrusive thermal flow measurement device for quantitatively determining fluid flow in a conduit, comprising:

a flexible clamp structure configured to externally conform to and maintain continuous circumferential thermal contact with conduits of varying diameters without requiring interchangeable inserts, the flexible clamp structure comprises two half-shells configured to flexibly adapt and snugly conform to conduit diameters between a range between approximately ¼ inch to approximately ⅝ inch, wherein the flexible clamp structure includes a fixed mechanical clamp assembly with an upper shell having a lower facing concave surface, and a lower shell having an upper facing concave surface, wherein the upper shell and the lower shell wrap about a section of the conduit wall, the fixed clamp assembly is assembled by either fasteners selected from at least one of screws and bolts for locking the upper shell to the lower shell, or is assembled by securing members selected from at least one of: magnets, latches, ties, spring clips, and latch clamps for securing the upper shell to the lower shell;

at least one heater configured to provide a heat flux of approximately 10 Watts per square inch to approximately 20 Watts per square inch, the at least one heater configured to externally heat only a portion of a conduit wall at a measurement location, without directly heating the bulk fluid inside the conduit, thereby avoiding vaporization and enabling portable, battery-powered operation;

a plurality of temperature sensors positioned along the conduit wall and configured to measure temperature differential between distinct points, the plurality of temperature sensors includes at least one sensor positioned upstream of the heater, at least one sensor positioned directly on the heater, and at least one sensor positioned downstream of the heater, wherein spacing between adjacent sensors is approximately 1.5 inches or approximately 38 millimeters;

wherein an upper half-shell of the two half-shells, includes:

an upper flexible pad pliable support between the upper half-shell and an upper half heater temperature sensor, and an upper half heater pad between the upper half heater temperature sensor and an upper half heater element;

wherein a lower half-shell of the two half shells includes:

a lower flexible pad pliable support between the lower half-shell and lower half-heater temperature sensor, and a lower half heater pad between the lower half heater temperature sensor and a lower half heater element;

and an electronic processor configured to calculate and determine a flow rate in the conduit based on steady-state temperature differentials which are the temperature differentials measured by said sensors when the temperature differentials have reached a steady-state within a time frame of approximately 3 minutes to approximately 15 minutes, wherein overall weight of the device is up to approximately 1 pound or approximately 454 grams, overall width of the device is approximately 1.7 inches or approximately 43 millimeters, and overall length of the device is approximately 7.6 inches or approximately 193 millimeters.

* * * * *